US012722535B2

(12) United States Patent
Heurlin et al.

(10) Patent No.: US 12,722,535 B2
(45) Date of Patent: Sep. 1, 2026

(54) ANTI-SUBMARINING SEAT SYSTEM

(71) Applicant: Volvo Car Corporation, Gothenburg (SE)

(72) Inventors: Fredrik Heurlin, Gothenburg (SE); Magnus Vilhelm Björklund, Torslanda (SE); Johan Magnus Rosenberg, Lerum (SE); Andreas Carlsson, Gothenburg (SE); Katarina Bohman, Lerum (SE); Peter Setterberg, Partille (SE); Jonas Östh, Gothenburg (SE); Peter Adolfsson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 341 days.

(21) Appl. No.: 18/455,092

(22) Filed: Aug. 24, 2023

(65) Prior Publication Data

US 2025/0065778 A1 Feb. 27, 2025

(51) Int. Cl.

*B60N 2/02* (2006.01)
*B60N 2/00* (2006.01)
*B60N 2/12* (2006.01)
*B60N 2/42* (2006.01)
*B60N 2/90* (2018.01)

(52) U.S. Cl.

CPC ......... *B60N 2/0278* (2023.08); *B60N 2/0022* (2023.08); *B60N 2/0028* (2023.08); *B60N 2/02246* (2023.08); *B60N 2/0272* (2023.08); *B60N 2/0273* (2023.08); *B60N 2/4263* (2013.01); *B60N 2/90* (2018.02); *B60N 2/0228* (2013.01); *B60N 2/12* (2013.01); *B60N 2002/981* (2018.02); *B60N 2210/24* (2023.08)

(58) Field of Classification Search

None

See application file for complete search history.

(56) References Cited

U.S. PATENT DOCUMENTS

| | | | | |
|---|---|---|---|---|
| 9,707,913 | B1 * | 7/2017 | Ochiai | B60R 16/037 |
| 2020/0298780 | A1 * | 9/2020 | Kanegae | B60N 2/0027 |
| 2022/0305959 | A1 * | 9/2022 | Kim | B60N 2/0276 |
| 2022/0388429 | A1 * | 12/2022 | Noguchi | B60N 2/0273 |
| 2023/0365030 | A1 * | 11/2023 | Ohno | B60Q 9/008 |
| 2024/0166092 | A1 * | 5/2024 | Ostling | B60R 21/01554 |
| 2024/0221396 | A1 * | 7/2024 | Raz | B60Q 9/00 |
| 2024/0278692 | A1 * | 8/2024 | Svitak | B60N 2/0244 |

OTHER PUBLICATIONS

"SAE J3016TM Levels of Driving Automation" SAE International, https://www.sae.org/binaries/content/assets/cm/content/blog/sae-j3016-visual-chart_5.3.21.pdf, Last Accessed Mar. 28, 2023, 1 page.

* cited by examiner

*Primary Examiner* — Lail A Kleinman

(74) *Attorney, Agent, or Firm* — Amin, Turocy & Watson, LLP

(57) ABSTRACT

Various systems and methods are presented regarding controlling respective positions of a seat back and seat base to mitigate the risk of a vehicle occupant submarining in the event of the vehicle being involved in a collision/rapid deceleration. Positioning of the seat back/seat base can be controlled in accordance with the occupant's physiology and posture, e.g., reclining. Cameras/radar sensors in the passenger compartment in conjunction with seat sensors can be generate physiology/positioning data, which can be processed, and based thereon, the seat back/base positions can be controlled by one or more motors.

20 Claims, 11 Drawing Sheets

130A
132A
120
122
128
124
125
VEHICLE COMP. 160
MOTORS 175A-*n*
114
VEH. DATA 162A-*n*
MOTOR INST 170A-*n*
CAMERAS/ SENSORS 130A-*n*
OCC. DATA 134A-*n*
SEAT DATA 138A-*n*
ANTI-SUBMARINING COMP. 112
OCC. DATA COMP. 140
MOTOR COMP. 150
ANGLE COMP. 155
SEAT DATA COMP. 145
MOTION COMP. 158
THRES. 157A-*n*
PROCESSES 165A-*n*
NOT. 190A-*n*
CONFIG.TABLE 115 PHYSIOLOGY + SEAT POSITION + VEHICLE to mitigate submarining
PROC. 182
MEM. 184
CU 186
HMI 188
SCN. 189
BT 187
COMP. SYSTEM 180
ANTI-SUBMARINING SYSTEM 110

200A

β
122
124
250
α
L
γ
δ
125
RECLINE SENSOR(S) 130A
RECLINE MOTOR 175A
TILT SENSOR(S) 130B
POSN/TILT MOTOR 175B
POSN/TILT SWITCH 210
RECLINE SWITCH 220
REC. MOTOR INST 170A
RECLINE DATA 138A
TILT MOTOR INST 170B
TILT/POSN DATA 138B
ANTI-SUBMARINING COMPONENT 112
MOTOR COMP. 150
INST 172A-n
ANGLE COMP. 155
SEAT DATA COMP. 145

200B

β
β1
β2
122
βmax
δmax
δ1
δ2
α
γ
α2
124
α1
αmax
125
RECLINE SENSOR(S) 130A
TILT SENSOR(S) 130B
RECLINE MOTOR 175A
POSN/TILT MOTOR 175B
POSN/TILT SWITCH 210
RECLINE SWITCH 220
REC. MOTOR INST 170A
TILT MOTOR INST 170B
RECLINE DATA 138A
TILT/POSN DATA 138B
ANTI-SUBMARINING COMPONENT 112
MOTOR COMP. 150
INST 172A-n
ANGLE COMP. 155
SEAT DATA COMP. 145

SAE J3016™ LEVELS OF DRIVING AUTOMATION 2018-06

1200

| | LEVEL 0 | LEVEL 1 | LEVEL 2 | LEVEL 3 | LEVEL 4 | LEVEL 5 |
|---|---|---|---|---|---|---|
| **What does the human in driver's seat have to do?** | You are driving whenever these driver support features are engaged – even if your feet are off the pedals and you are not steering | | | You are not driving whenever these automated driving features are engaged – even if you are seated in "the driver's seat" | | |
| | You must constantly supervise these support features; you must steer, brake or accelerate as needed to maintain safety | | | When the feature requests, you must drive | These automated driving features will not require you to take over driving | |
| | **These are driver support features** | | | **These are automated driving features** | | |
| **What do these features do?** | These features are limited to providing warnings and momentary assistance | These features provide steering **OR** brake/ acceleration support to the driver | These features provide steering **AND** brake/ acceleration support to the driver | These features can drive the vehicle under limited conditions and will not operate unless all required conditions are met | | This feature can drive the vehicle under all conditions |
| **Example Features** | • automatic emergency • braking blind spot • warning lane departure warning | • lane centering **OR** • adaptive cruise control | • lane centering **AND** • adaptive cruise control at the same time | • traffic jam chaffeur | • local driverless taxi • pedals/ steering wheel may or may not be installed | • same as level 4, but feature can drive everywhere in all conditions |

FIG. 12 (Prior Art)

ANTI-SUBMARINING SEAT SYSTEM

TECHNICAL FIELD

The present disclosure generally relates to a seat system configured to prevent submarining during a collision/deceleration of a vehicle.

BACKGROUND

Submarining is a term used to describe a motion of a person sat in a seat during a collision/rapid deceleration of a vehicle. Submarining can occur when a lap belt portion of a seat belt slips over the anterior superior iliac spine (ASIS) region of the pelvis and impinges on the occupants stomach. As autonomous vehicles become commonplace on the roads, it is likely that passengers will rest/sleep in an inclined position during travel, e.g., with a seat back in a reclined position, increasing the probability/likelihood of a submarining incident occurring.

During impact, the mass of the person can cause them to be propelled forward. A three-point seat belt system may help to secure them in the seat. However, given the reclined seat position, the possibility exists that the impact causes the person to slide out from under the seat belt, which can cause injury (e.g., legs are trapped in the foot well of the vehicle), the lap belt portion of the seat belt impinges on the soft tissue of the abdomen/stomach region, and can even result in them being ejected from the vehicle (e.g., in a case of vehicle roll-over).

To prevent submarining, vehicle seats can include an "anti-submarining" plate, such as a metal plate that is upwardly inclined in the forward-facing direction. During a collision, the load path can cause the person's pelvis to be directed into the seat, the anti-submarining plate is configured such that as the person's pelvis moves in a forward direction on the inclined plate, the plate causes the pelvis to rise thereby increasing the possibility that the person will be constrained by the seat belt. However, with the ability to incline a vehicle seat (e.g., to sleep, read, etc.) the possibility still exists that owing to the more flattened position of the seat and the corresponding posture of the person, the person can still submarine relative to the seat belt.

The above-described background is merely intended to provide a contextual overview of some current issues and is not intended to be exhaustive. Other contextual information may become further apparent upon review of the following detailed description.

SUMMARY

The following presents a summary to provide a basic understanding of one or more embodiments described herein. This summary is not intended to identify key or critical elements, or delineate any scope of the different embodiments and/or any scope of the claims. The sole purpose of the summary is to present some concepts in a simplified form as a prelude to the more detailed description presented herein.

In one or more embodiments described herein, systems, devices, computer-implemented methods, methods, apparatus and/or computer program products are presented to prevent and/or mitigate the probability of a submarining event occurring, and in the event of a submarining event occurring, reducing injury to a vehicle occupant as a function of the occupant changing their posture.

According to one or more embodiments, a system can be located on a vehicle, wherein the vehicle can be operating autonomously, partially autonomously, or non-autonomously. The system can comprise a memory that stores computer executable components and a processor that executes the computer executable components stored in the memory. The computer executable components can comprise an anti-submarining component configured to determine an occupant is located in a seat onboard the vehicle and further determine a seat angle between a seat back and a seat base, wherein the seat back and seat base combine to form the seat. In another embodiment, the anti-submarining component can be further configured to, in the event of the seat angle exceeds a first unsafe angle, adjust the position of at least one of the seat back or the seat base to reduce the seat angle, wherein the unsafe angle has a magnitude to render a submarining event involving the occupant likely.

In another embodiment, the anti-submarining component can be further configured to (i) determine at least one feature of the occupant, wherein the at least one feature comprises the occupant's physiology, location of the occupant's pelvis, tilt angle of the occupant's pelvis, the occupant's height, or the occupant's posture, (ii) determine, based on the at least one feature of the occupant, whether the seat angle is at a second unsafe angle, and/or (iii) in the event of determining the seat angle is at the second unsafe angle, reducing the seat angle.

In a further embodiment, the system can further comprise a first sensor configured to determine at least one of the occupant is located in the seat, the occupant's physiology, the occupant's height, or the occupant's posture, wherein the first sensor can be a camera or a radar device. In another embodiment, the system can further comprise a second sensor located in the seat back, wherein the second sensor can be configured to determine an angle of recline of the seat back. In a further embodiment, the system can further comprise a third sensor located in the seat base, wherein the third sensor can be configured to determine at least one of an angle of tilt of the seat base or a longitudinal position of the seat base. Further, the anti-submarining component can be configured to determine the seat angle based on an angle between the angle of recline of the seat back and the angle of tilt of the seat base.

In a further embodiment, the anti-submarining component can be further configured to determine a distance between the occupant and an airbag, and in the event that the distance is insufficient, adjust position of the seat base in the longitudinal direction to reduce the distance.

In a further embodiment, the system can further comprise one or more motors configured to adjust the position of at least one of the seat back or the seat base to reduce the seat angle, wherein the anti-submarining component can be further configured to transmit an instruction to the one or more motors instructing the one or more motors to operate to reduce the seat angle.

In another embodiment, the anti-submarining component can be further configured to generate and transmit a notification regarding the position of the seat being adjusted, wherein the system can further comprise a display component configured to present the notification to the occupant indicating the seat is being adjusted.

In other embodiments, elements described in connection with the disclosed systems can be embodied in different forms such as computer-implemented methods, computer program products, or other forms. For example, in an embodiment, a computer-implemented method can be utilized for determining, by a device comprising a processor located on a vehicle, a person is located on a seat located onboard the vehicle, wherein the seat comprises a seat back and a seat base, and further, adjusting, by the device, at least one of a position of the seat back or the seat base to mitigate possibility of the person being involved in a submarining incident, wherein the submarining incident results from a deceleration of the vehicle.

In an embodiment, the computer-implemented method can further comprise (i) determining, by the device, at least one feature of the person, wherein the at least one feature comprises the person's physiology, location of the person's pelvis, tilt angle of the person's pelvis, the person's height, or the person's posture, (ii) determining, by the device, based on the at least one feature of the occupant, whether the seat angle is at the unsafe angle, and/or (iii) in the event of determining the seat angle is at the unsafe angle, reducing the seat angle.

In another embodiment, the computer-implemented method can further comprise, in response to a determination of the seat is at an unsafe angle, presenting a notification on a display in the vehicle, wherein the notification is a request for the person to change their posture.

In another embodiment, the computer-implemented method can further comprise determining, by the device, the vehicle is stationary, and in response to determining the vehicle is stationary, terminating determining position of the seat back or the seat base.

Another embodiment can comprise a computer program product for reducing probability of a submarining event occurring on a vehicle, wherein the computer program product can comprise a computer readable storage medium having program instructions embodied therewith, the program instructions executable by a processor to cause the processor to determine a person is located on a seat located onboard the vehicle, wherein the seat comprises a seat back and a seat base, and adjust at least one of a position of the seat back or the seat base to mitigate possibility of the person being involved in a submarining incident, wherein the submarining incident results from a deceleration of the vehicle.

In another embodiment, the program instructions can be further executable by the processor to cause the processor to (i) determine at least one feature of the person, wherein the at least one feature comprises the person's physiology, location of the person's pelvis, tilt angle of the person's pelvis, the person's height, or the person's posture, (ii), determine, based on the at least one feature of the occupant, whether the seat angle is at the unsafe angle, and/or (iii) in the event of determining the seat angle is at the unsafe angle, reducing the seat angle.

In a further embodiment, the program instructions can be further executable by the processor to cause the processor to, in response to a determination of the seat is at an unsafe angle, present a notification on a display in the vehicle, wherein the notification is a request for the person to change their posture.

In another embodiment, the program instructions can be further executable by the processor to cause the processor to determine the vehicle is stationary, and in response to determining the vehicle is stationary, terminating determining position of the seat back or the seat base.

An advantage of the one or more systems, computer-implemented methods, and/or computer program products can be utilizing various systems and technologies located on a vehicle to determine a position of a seat or posture/physiology of an occupant to determine whether a submarining incident is probable, and if so, the position of the seat can be automatically adjusted to reduce the probability of the submarining incident. Further, a request for the occupant to adjust their posture can also be automatically presented in an attempt to reduce the probability of the submarining event occurring.

DESCRIPTION OF THE DRAWINGS

One or more embodiments are described below in the Detailed Description section with reference to the following drawings.

FIG. 12 presents a summary of SAE J3016 detailing respective functions and features during Levels 0-5 of driving automation (per June 2018).

DETAILED DESCRIPTION

Figure 1:
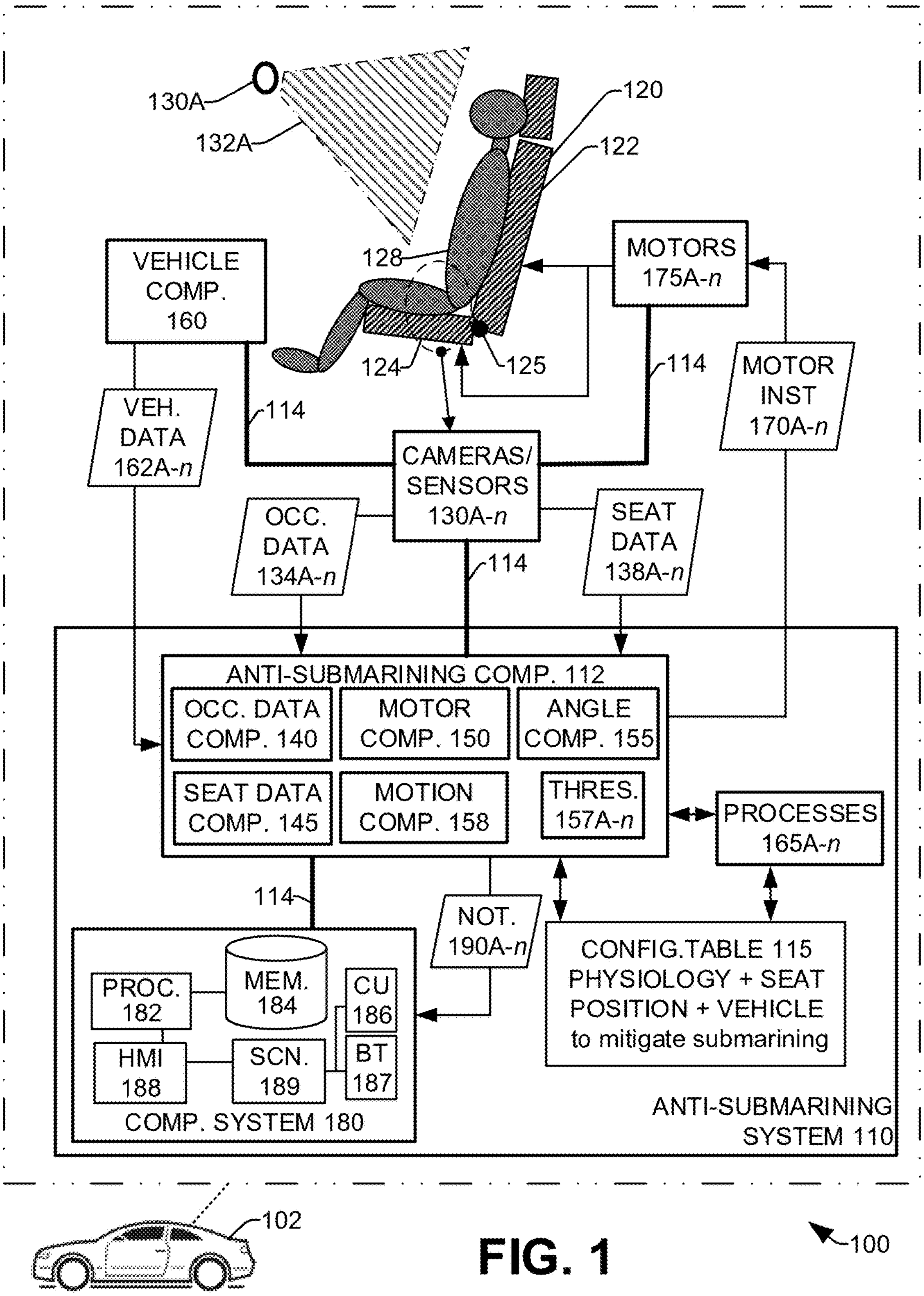
FIG. 1 presents a system that can be configured to prevent/reduce the risk of a submarining event occurring during deceleration of vehicle, in accordance with at least one embodiment.

The following detailed description is merely illustrative and is not intended to limit embodiments and/or application or uses of embodiments. Furthermore, there is no intention to be bound by any expressed and/or implied information presented in any of the preceding Background section, Summary section, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling. Likewise, it is to be understood that when an element is referred to as being "connected" to another element, it can describe one or more different types of connecting including, but not limited to, electrical connecting, electromagnetic connecting, operative connecting, optical connecting, physical connecting, thermal connecting, and/or another type of connecting.

As used herein, "data" can comprise metadata. Further, ranges A-n are utilized herein to indicate a respective plurality of devices, components, signals, datasets, etc., where n is any positive integer.

In the various embodiments presented herein, the disclosed subject matter relates to mitigating/reducing probability of an occupant being injured as a result of a submarining incident occurring when a vehicle on which they are onboard reduces velocity and/or is in involved in a collision/accident. As previously described, a reclined vehicle seat in conjunction with an occupant's physiology can lead to submarining with a seatbelt impinging upon the occupant's stomach potentially damaging the various associated soft organs of that region of the body, the occupant no longer being restrained by the seat belt, and suchlike.

By monitoring positioning of a seat onboard a vehicle, e.g., with regard to a position of a seat back relative to a seat base, in conjunction with one or more physical features of an occupant and their position/location on the seat, a determination(s) can be made regarding the probability of a submarining event occurring and its severity regarding injury of the occupant. In response to a determination of a submarining event occurring, an anti-submarining system can be configured to, in a non-limiting list, automatically (a) adjust position of the seat back relative to a position of the seat base, e.g., the seat base can be tilted to limit a recline angle of the seat back and/or the seat back is raised, seat base longitudinally repositioned, (b) suggest to the occupant that they change their current position in the seat, and suchlike.

In response to a determination that there is no risk of a submarining event (e.g., the vehicle is parked), the seat position can remain in a current configuration. In an embodiment, the approximate position of an occupant's pelvis can be monitored/determined, with the seat base tilted to ensure that the occupant's pelvis is engaged with the seat base in the event of the vehicle decelerating, e.g., momentum of the occupant's body drives the pelvis into the seat base rather than the pelvis sliding along the seat base.

It is to be appreciated that the various embodiments presented herein can be implemented automatically by one or more components and/or systems configured to perform the one or more operations, functions, etc., e.g., by one or more components included in the anti-submarining system. Automated operations can include, for example, in a non-limiting list: determining a position of a seat (e.g., seat back and/or seat base); determining physiology, posture, etc., of a vehicle occupant; determination of a possibility of a submarining event occurring; adjusting alignment of the seat (e.g., of the seat back relative to the seat base) to minimize likelihood of the submarining event occurring and/or injury; requesting the occupant to change their posture to reduce the likelihood of the submarining event occurring, and the like.

The various embodiments presented herein can pertain to any of a vehicle operating non-autonomously (e.g., a passenger has a seat fully reclined as they are not involved in driving the vehicle), partially autonomously, or fully autonomously. As autonomous vehicles become more prevalent, the probability of a vehicle occupant taking advantage of a vehicle operating autonomously to recline a seat will become commonplace, with an according rise in potential for submarining events. By utilizing an onboard system to continually/automatically assess a probability of a submarining event occurring, with an associated adjustment of the seat and its respective components, the various embodiments presented herein can be utilized to reduce/mitigate injury from a submarining event.

Regarding the term "autonomous" operation, to enable the level of sophistication of operation of a vehicle to be defined across the industry by both suppliers and policymakers, standards are available to define the level of autonomous operation. For example, the International Standard J3016 Taxonomy and Definitions for Terms Related to Driving Automation Systems for On-Road Motor Vehicles has been developed by the Society of Automotive Engineers (SAE) and defines six levels of operation of a driving automation system(s) that performs part or all of the dynamic driving task (DDT) on a sustained basis. The six levels of definitions provided in SAE J3016 range from no driving automation (Level 0) to full driving automation (Level 5), in the context of vehicles and their operation on roadways. Levels 0-5 of SAE J3016 are summarized below and further presented in FIG. 12, Table 1200.

Level 0 (No Driving Automation): At Level 0, the vehicle is manually controlled with the automated control system (ACS) having no system capability, the driver provides the DDT regarding steering, braking, acceleration, negotiating traffic, and suchlike. One or more systems may be in place to help the driver, such as an emergency braking system (EBS), but given the EBS technically doesn't drive the vehicle, it does not qualify as automation. The majority of vehicles in current operation are Level 0 automation.

Level 1 (Driver Assistance/Driver Assisted Operation): This is the lowest level of automation. The vehicle features a single automated system for driver assistance, such as steering or acceleration (cruise control) but not both simultaneously. An example of a Level 1 system is adaptive cruise control (ACC), where the vehicle can be maintained at a safe distance behind a lead vehicle (e.g., operating in front of the vehicle operating with Level 1 automation) with the driver performing all other aspects of driving and has full responsibility for monitoring the road and taking over if the assistance system fails to act appropriately.

Level 2 (Partial Driving Automation/Partially Autonomous Operation): The vehicle can (e.g., via an advanced driver assistance system (ADAS)) steer, accelerate, and brake in certain circumstances, however, automation falls short of self-driving as tactical maneuvers such as responding to traffic signals or changing lanes can mainly be controlled by the driver, as does scanning for hazards, with the driver having the ability to take control of the vehicle at any time.

Level 3 (Conditional Driving Automation/Conditionally Autonomous Operation): The vehicle can control numerous aspects of operation (e.g., steering, acceleration, and suchlike), e.g., via monitoring the operational environment, but operation of the vehicle has human override. For example, the autonomous system can prompt a driver to intervene when a scenario is encountered that the onboard system cannot navigate (e.g., with an acceptable level of operational safety), accordingly, the driver must be available to take over operation of the vehicle at any time.

Level 4 (High Driving Automation/High Driving Operation): advancing on from Level 3 operation, while under Level 3 operation the driver must be available, with Level 4, the vehicle can operate without human input or oversight but only under select conditions defined by factors such as road type, geographic area, environments limiting top speed (e.g., urban environments), wherein such limited operation is also known as "geofencing". Under Level 4 operation, a human (e.g., driver) still has the option to manually override automated operation of the vehicle.

Level 5 (Full Driving Automation/Full Driving Operation): Level 5 vehicles do not require human attention for operation, with operation available on any road and/or any road condition that a human driver can navigate (or even beyond the navigation/driving capabilities of a human). Further, operation under Level 5 is not constrained by the geofencing limitations of operation under Level 4. In an embodiment, Level 5 vehicles may not even have steering wheels or acceleration/brake pedals. In an example of use, a destination is entered for the vehicle (e.g., by a passenger, by a supply manager where the vehicle is a delivery vehicle, and suchlike), wherein the vehicle self-controls navigation and operation of the vehicle to the destination.

To clarify, operations under levels 0-2 can require human interaction at all stages or some stages of a journey by a vehicle to a destination. Operations under levels 3-5 do not require human interaction to navigate the vehicle (except for under level 3 where the driver is required to take control in response to the vehicle not being able to safely navigate a road condition).

As referenced herein, DDT relates to various functions of operating a vehicle. DDT is concerned with the operational function(s) and tactical function(s) of vehicle operation, but may not be concerned with the strategic function. Operational function is concerned with controlling the vehicle motion, e.g., steering (lateral motion), and braking/acceleration (longitudinal motion). Tactical function (aka, object and event detection and response (OEDR)) relates to the navigational choices made during a journey to achieve the destination regarding detecting and responding to events and/or objects as needed, e.g., overtake vehicle ahead, take the next exit, follow the detour, and suchlike. Strategic function is concerned with the vehicle destination and the best way to get there, e.g., destination and way point planning. Regarding operational function, a Level 1 vehicle under SAE J3016 controls steering or braking/acceleration, while a Level 2 vehicle must control both steering and braking/acceleration. Autonomous operation of vehicles at Levels 3, 4, and 5 under SAE J3016 involves the vehicle having full control of the operational function and the tactical function. Level 2 operation may involve full control of the operational function and tactical function but the driver is available to take control of the tactical function.

Accordingly, the term "autonomous" as used herein regarding operation of a vehicle with or without a human available to assist the vehicle in self-operation during navigation to a destination, can relate to any of Levels 1-5. In an embodiment, for example, the terms "autonomous operation" or "autonomously" can relate to a vehicle operating at least with Level 2 operation, e.g., a minimum level of operation is Level 2: partially autonomous operation, per SAE J3016. Hence, while Level 2, partially autonomous operation, may be a minimum level of operation, higher levels of operation, e.g., Levels 3-5, are encompassed in operation of the vehicle at Level 2 operation. Similarly, a minimum Level 3 operation encompasses Levels 4-5 operation, and minimum Level 4 operation encompasses operation under Level 5 under SAE J3016.

It is to be appreciated that while the various embodiments presented herein are directed towards to one or more vehicles (e.g., vehicle 102) operating in an autonomous manner (e.g., as an autonomous vehicle (AV)), the various embodiments presented herein are not so limited and can be implemented with a group of vehicles operating in any of an autonomous manner (e.g., Level 5 of SAE J3016), a partially autonomous manner (e.g., Level 1 of SAE J3016 or higher), or in a non-autonomous manner (e.g., Level 0 of SAE J3016). For example, the vehicle can be operating in an autonomous manner (e.g., any of Levels 3-5), a partially autonomous manner (e.g., any of levels 1-2), or in a non-autonomous manner (e.g., Level 0).

Turning now to the drawings, FIG. 1 illustrates a system 100 configured to prevent/reduce the risk of a submarining event occurring during deceleration of a vehicle, in accordance with at least one embodiment. System 100 comprises an anti-submarining system 110 located onboard a vehicle 102. As previously mentioned, vehicle 102 can be operating in a fully autonomous manner, a partially autonomous manner, or in a non-autonomous manner. Anti-submarining system 110 can include an anti-submarining component (ASC) 112, wherein the ASC 112 can be configured to control operation and positioning of a seat 120 to reduce the probability of a submarining event occurring and/or reduce the magnitude of injury in the event of a submarining event occurring. Seat 120 can comprise a seat back 122 (aka a backrest) and a seat base 124 (e.g., comprising a seat cushion), with a passenger/occupant/person 128 located/sitting on the seat 120. Seat back 122 and seat base 124 can be connected via/rotate about, a hinge 125.

As shown in FIG. 1, the ASC 112 can be communicatively coupled to various cameras/sensors 130A-*n* configured to generate various occupant data/images 134A-*n* and seat data/images 138A-*n*. The cameras/sensors 130A-*n* can include any suitable detection/measuring device, including cameras, infra-red cameras, optical sensors, laser sensors, Light Detection and Ranging (LiDAR) sensors, radar, sonar sensors, audiovisual sensors, perception sensors, motion detectors, velocity sensors, and the like, as employed by applications and computer-based technologies and methods utilized to determine pertinent information regarding position/angle of seat back 122, seat base 124, and/or occupant 128 position/physiology. The cameras/sensors 130A-*n* can be controlled by any of the respective components located onboard vehicle 102. For example, the ASC 112 can control operation (e.g., on/off, direction/field of view 132, etc.) of the cameras/sensors 130A-*n* to enable detection of occupant 128, position/angle of seat back 122 and/or seat base 124, etc.

In an embodiment, the cameras/sensors 130A-*n* can be configured to monitor the occupant 128 to enable determination (e.g., by the ASC 112) of any of the anthropomorphic features/physiology of the occupant 128, a posture of the occupant 128 (e.g., sitting upright, reclining, and suchlike), location and/or tilt (e.g., approximate) of occupant 128's pelvis, location of occupant 128 with respect to other components/devices onboard vehicle 102 (e.g., a knee airbag 250, per FIG. 2), and suchlike. The cameras/sensors 130A-*n* can be configured to generate and transmit occupant data 134A-*n* comprising data/information/images obtained by cameras/sensors 130A-*n* regarding the occupant 128's physiology, posture, position, and suchlike. In an embodiment, the cameras/sensors 130A-*n* can be any suitable device/technology to enable occupant data 134A-*n* to be obtained, wherein the cameras/sensors 130A-*n* can be located in the passenger compartment (per FIG. 3) of vehicle 102. For example, camera 130A with a field of view 132A directed at the respective seat, e.g., any of seats 120A-*n* located onboard vehicle 102, in which the occupant 128 may be sitting, wherein more than one occupant 128A-*n* may be sitting/reclining in a respective seat 120A-*n*, in accordance with one or more embodiments presented herein.

In another embodiment, the cameras/sensors 130A-*n* can be configured to monitor operation and/or position of the seat 120 with regard to any of the position/angle/incline of seat back 122, position/angle/tilt of seat base 124, and suchlike. The cameras/sensors 130A-*n* can be configured to generate and transmit seat data 138A-*n* regarding data/images obtained about any of the position/angle/incline of seat back 122, position/angle/tilt of seat base 124, and suchlike. In an embodiment, the cameras/sensors 130A-*n* can be any suitable device/technology to enable seat data 134A-*n* to be obtained, wherein the cameras/sensors 130A-*n* can be located in any of the seat 120, seat back 122, seat base 124. Cameras/sensors 130A-*n* can include in-seat strain sensors, position sensors, and suchlike.

As further shown in FIG. 1, the ASC 112 can include an occupant data component 140. The occupant data component 140 can be configured to receive and process (e.g., in conjunction with processes 165A-*n*) the occupant data 134A-n from the cameras/sensors 130A-*n*. In another embodiment, the ASC 112 can also include a seat data component 145. The seat data component 145 can be configured to receive and process (e.g., in conjunction with processes 165A-*n*) the seat data 138A-*n* from the cameras/sensors 130A-*n*. In an embodiment, the occupant data 134A-*n* and/or seat data 138A-*n* can include digital images, etc., wherein the ASC 112 (e.g., occupant data component 140 and/or seat data component 145 in conjunction with processes 165A-*n*) can be configured to analyze the digital images, etc., to determine any of the occupant 128's physiology, posture, approximate pelvis location, pelvis angle, recline angle $\beta$ of seat back 122, angle $\delta$ between seat back 122 and seat base 124, tilt angle $\alpha$ of seat base 124, position $\gamma$ of seat base 124, and suchlike (as further described).

In an embodiment, the ASC 112 can be further communicatively coupled to one or more motors 175A-*n*. Motors 175A-*n* can be respectively coupled to the seat back 122 and/or the seat base 124, wherein the motors 175A-*n* can be utilized by the ASC 112 to control positioning/incline/tilt of the seat back 122 and/or the seat base 124 to reduce the risk of occupant 128 being involved in a submarining event. Operation of the motors 175A-*n* can be controlled by the ASC 112, with ASC 112 being configured to generate and transmit motor instructions 170A-*n* to the motors 175A-*n*, and further, motors 175A-*n* can be configured to receive/process the motor instructions 170A-*n* and further adjust the respective positions, etc., of seat back 122 and seat base 124 accordingly.

Figure 2A:
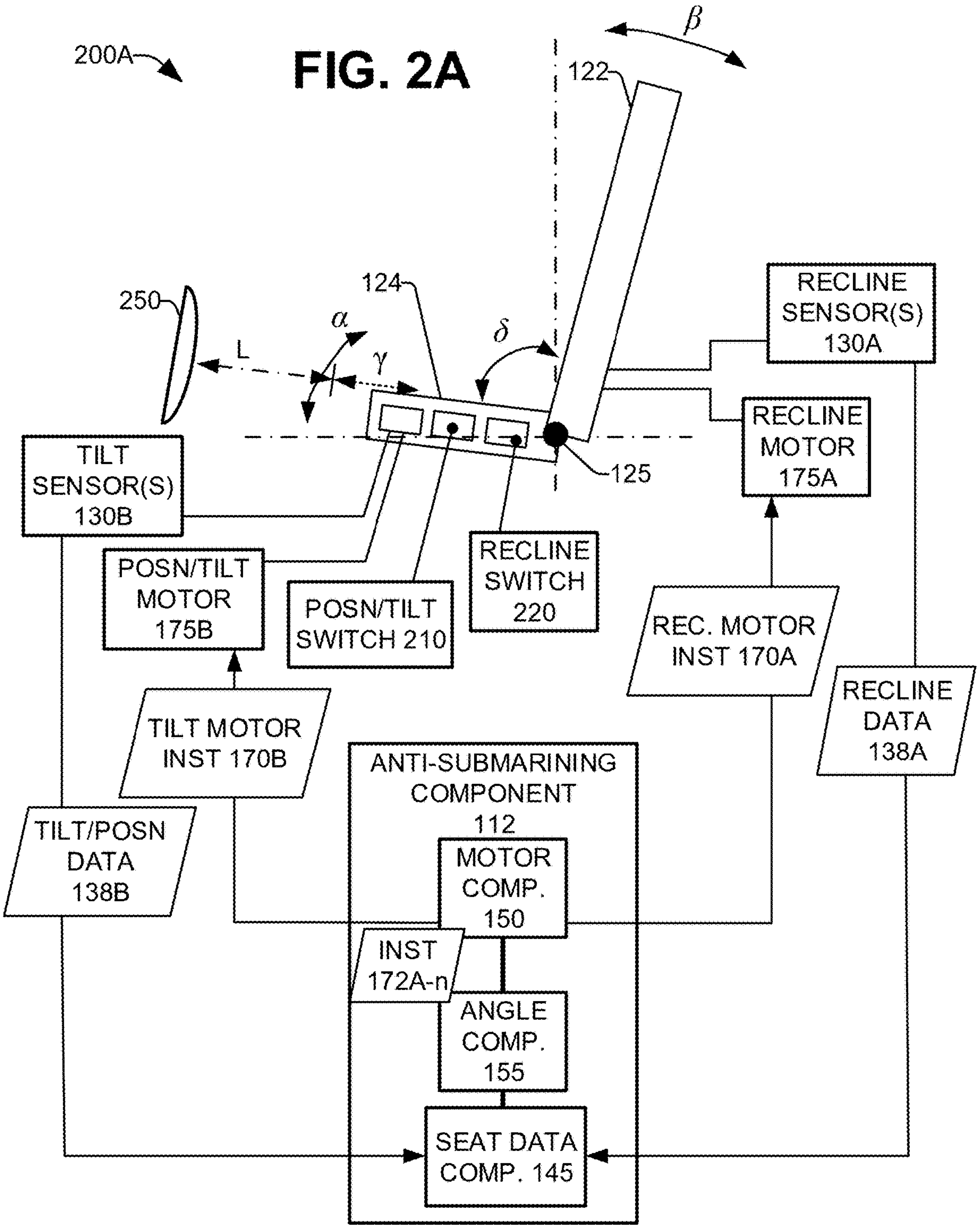
FIGS. 2A and 2B present schematics illustrating respective positions of a seat back and a seat base, in accordance with at least one embodiment.
Figure 2B:
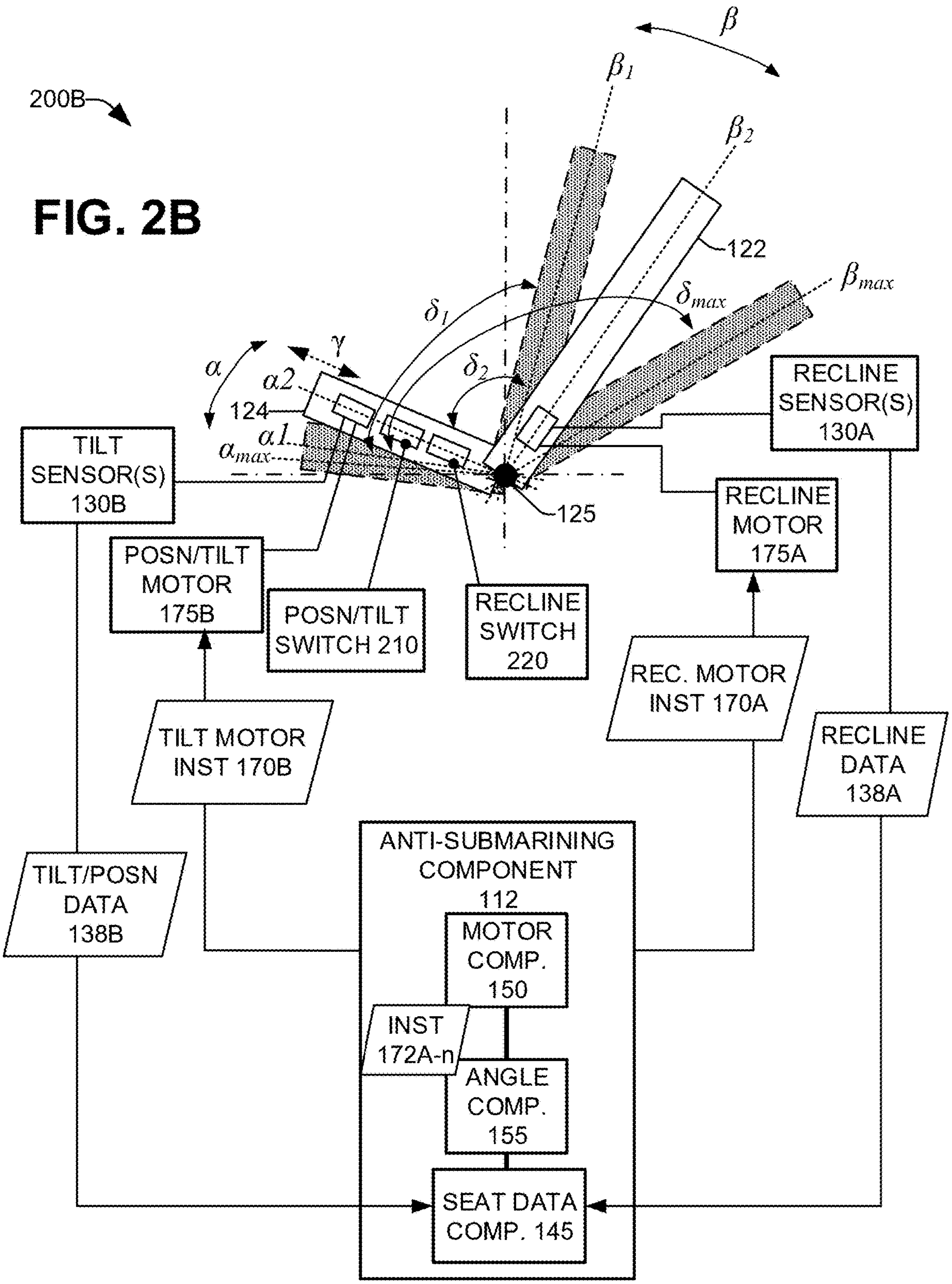

FIG. 1 can be read in conjunction with FIGS. 2A and 2B, wherein FIGS. 2A and 2B, schematics 200A and 200B illustrate respective positions of the seat back 122 and the seat base 124, in accordance with at least one embodiment. As shown, seat back 122 is configured to be inclined/reclined through a range of angles $\beta$ (e.g., in the substantially vertical plane), while seat base 124 is configured to be tilted through a range of angles $\alpha$ and also adjusted in substantially the horizontal/longitudinal direction $\gamma$. Angle $\delta$ indicates the angle between the seat back 122 and the seat base 124. A recline motor 175A can be connected to the seat back 122 to enable the seat back 122 to be inclined through the range of angles $\beta$. A position/tilt motor 175B can be connected to the seat base 124 to enable the seat base 124 to be tilted through the range of angles $\alpha$ and/or adjusted in substantially the horizontal/longitudinal direction $\gamma$. Any of the motors 175A-*n*, e.g., recline motor 175A and tilt motor 175B can respectively comprise an electric motor, a servo, an actuator, recline motor, tilt motor, gear-drive motor, spindle motor, and suchlike, as required to enable inclining of seat back 122 through the range of angles $\beta$ and tilting of the seat base 124 through the range of angles $\alpha$ and/or positioning along the direction $\gamma$. It is to be appreciated that while only two motors 175A-*n* are depicted in FIGS. 2A and 2B (e.g., recline motor 175A and tilt motor 175B), any number of motors 175A-*n* can be utilized to respectively recline/tilt/position seat back 122 and seat base 124.

In an embodiment, as shown in FIGS. 2A and 2B, respective position (tilt, incline, etc.) of the seat back 122 and seat base 124 can be manually controlled (e.g., by occupant 128) via tilt switch 210 (adjusting position of seat base 124) and recline switch 220 (adjusting position of seat back 122). However, as further described, the respective motion/positioning of the seat back 122 and seat base 124 by the tilt switch 210 and the recline switch 220 can be limited in accordance with maximum angles $\alpha_{max}$, $\beta_{max}$, $\delta_{max}$, and position $\gamma_{max}$ (e.g., as constrained by values defined in configuration table 115), e.g., depending upon whether vehicle 102 is stationary or in motion.

A recline sensor 130A can be incorporated into/attached to the seat back 122 to generate recline data 138A, wherein the recline sensor 130A can be communicatively coupled to the seat data component 145 included in the ASC 112 and further configured to transmit the recline data 138A to the seat data component 145, wherein the seat data component 145 can be configured to receive/process the recline data 138A from the recline sensor 130A. Similarly, a tilt sensor 130B can be incorporated into/attached to the seat base 124 to generate tilt data 138B, wherein the tilt sensor 130B can be communicatively coupled to the seat data component 145 and further configured to generate and transmit the tilt data 138B to seat data component 145, wherein the seat data component 145 can be configured to receive/process the tilt data 138B from the tilt sensor 130B.

ASC 112 can further include a motor component 150 configured to control operation of the recline motor 175A and the tilt motor 175B (and/or any motors 175A-*n*). In an embodiment, the motor component 150 can operate in conjunction with an angle component 155 via instructions 172A-*n* being generated and transmitted by the angle component 155 (ASC 112). The motor component 150 can be communicatively coupled to the recline motor 175A and the tilt motor 175B. The motor component 150 can be configured to generate and transmit recline motor instructions 170A to the recline motor 175A, wherein the recline motor instructions 170A can be configured to control operation of the recline motor 175A. The motor component 150 can also be configured to generate and transmit tilt motor instructions 170B to the tilt motor 175B, wherein the tilt motor instructions 170B can be configured to control operation of the tilt motor 175B.

The angle component 155 can be configured compare seat data 138A-*n* (e.g., recline data 138A, tilt data 138B), and occupant data 134A-*n* with one or more defined configurations (e.g., predefined configuration data) included in the configuration table 115, as further described. Configuration table 115 can comprise/be populated with values correlating to angle(s) $\beta$ of the seat back 122 relative to the angle(s) $\alpha$ of the seat base 124, per angle(s) $\delta$. As mentioned, as the seat back 122 is reclined (e.g., from angle $\beta_1$ to angle $\beta_2$) the seat base 124 can be tilted accordingly (e.g., from angle $\alpha_1$ to $\alpha_2$) so as to maintain an approximate angle $\delta$ (e.g., from angle $\delta_1$, to $\delta_2$) between the seat back 122 and the seat base 124. In the example of operation provided herein, the angle $\delta$ can be maintained between a range of 90° to 180°, however, it is to be appreciated that the range of angle $\delta$ is arbitrary and configuration table 115 being configured/defined/populated with any range of desired values.

As shown in FIG. 1, in an embodiment, the ASC 112 can be communicatively coupled to a vehicle component 160, and further configured to receive vehicle data 162A-*n* generated and transmitted by the vehicle component 160. The vehicle component 160 can be configured to operate/control/monitor various vehicle operations, wherein such operations can include any of velocity control, braking, acceleration of the vehicle 102. In an embodiment, the vehicle component 160 can be configured to generate vehicle data 162A-*n*, wherein vehicle data 162A-*n* can include a notification regarding whether vehicle 102 is stationary or moving. In an embodiment, a motion component 158 included in ASC 112 can be configured to review the vehicle data 162A-*n* and make a determination regarding whether vehicle 102 is stationary or moving. As mentioned, the submarining phenomenon generally results from a deceleration of vehicle 102 (e.g., during braking or a collision), whereby the mass of occupant 128 can cause the occupant 128 to be propelled forward, and per the various embodiments presented herein, the respective position of the seat back 122 and the seat base 124 can be controlled to reduce the possibility of the submarining event from occurring. As shown in FIG. 2B, a maximum angle of $\delta_{max}$ can be configured such that while vehicle 102 is in motion, the angle $\delta$ should be maintained to be less than the maximum angle $\delta_{max}$. However, while vehicle 102 is parked/stationary, the position of the seat back 122 relative to the seat base 124 can be positioned at any angle $\delta$ (with the only constraint being the physical mechanism comprising seat back 122 and seat base 124, as well as a second seat 120B limiting reclining motion through angle $\delta$ of a first seat 120A), e.g., to enable occupant 128 be in a posture for sleep. Hence, in response to receiving an indication in vehicle data 162A-*n* that vehicle 102 is currently stationary, the maximum angle of $\delta_{max}$ of seat back 122 can be exceeded by occupant 128.

In an embodiment, in response to motion component 158 determining that vehicle 102 is stationary (e.g., per vehicle data 162A-*n*), the motion component 158 can be configured to terminate control of the position of seat 120 by angle component 155, and further initiate position control of seat 120 by angle component 155 in the event of motion component 158 further determines vehicle 102 is in motion (e.g., per vehicle data 162A-*n*).

As shown in FIG. 1, the anti-submarining system 110 can further include an onboard computing system (OCS) 180, wherein the OCS 180 can be a vehicle control unit (VCU), an electronic control unit (ECU), an electronic control module, and suchlike. The OCS 180 can be utilized to provide overall operational control and/or operation of vehicle 102, e.g., via vehicle component 160.

As shown in FIG. 1, the OCS 180 can further include a processor 182 and a memory 184, wherein the processor 182 can execute the various computer-executable components, functions, operations, etc., presented herein. The memory 184 can be utilized to store the various computer-executable components, functions, code, etc., as well as occupant data 134A-*n*, seat data 138A-*n*, vehicle data 162A-*n*, motor instructions 170A-*n*, instructions 172A-*n*, data respectively stored/populating configuration table 115 (e.g., occupant data 534A-*n*, seat data 538A-*n*, vehicle data 562A-*n*), thresholds 157A-*n*, probabilities 510A-*n*, mitigating positions 520A-*n*, and suchlike.

As further shown, the OCS 180 can include a human-machine interface (HMI) 188 (e.g., a display, a graphical-user interface (GUI)) which can be configured to present various notifications 190A-*n* regarding respective positions of seat back 122, seat base 124, and/or occupant 128, per the various embodiments presented herein. The HMI 188 can include an interactive display/screen 189 to present the various information via various screens presented thereon, and further configured to facilitate input of information/settings/etc., regarding operation of the vehicle 102. In an embodiment, the ASC 112 can generate and transmit a notification 190A-*n* for presentation of the screen 189 indicating whether the seat back 122 and seat base 124 cannot be extended beyond the maximum angle of $\delta_{max}$ by occupant 128, such that the ASC 112 is controlling the angle $\delta$. (e.g., to inform occupant 128 that the ASC 112 is limiting motion of the seat back 122 and seat base 124). In an embodiment, notification 190A-*n* can include a representation of the seat 120 indicating to occupant 128 the respective position of the seat back 122 and seat base 124. In another embodiment, the interactive screen 189 can be configured to include a button/touch sensitive area 187, whereby selection of the button 187 can be utilized to override automatic adjustment of the position of the seat 120. The HMI 188/screen 189 can further include a counter 186, such that if the button 187 is selected prior to counter 186 elapsing, automatic adjustment of the seat 120 is overridden, otherwise, in the event of counter 186 elapsing, adjustment of seat 120 can be performed automatically. Hence, if an occupant 128 does not want the position of seat 120 to be adjusted, occupant 128 can override the position adjustment. It is to be appreciated that while the various embodiments presented herein relate to reduction of seat angle to reduce probability of a submarining event occurring, the respective embodiments are not so limited, and can also equally pertain to an increase in seat angle, e.g., in view of the anthropomorphic features of the occupant 128, etc.

The various components located onboard vehicle 102 (e.g., anti-submarining system 110, ASC 112, cameras/sensors 130A-*n*, vehicle component 160, motors 175A-*n*, OCS 180, and suchlike) can be communicatively coupled via an onboard computer network/communication bus 114. Network/bus 114 can be any suitable vehicle-borne, embedded system, for example, FLEXRAY, Controller Area Network (CAN), Ethernet, Local Interconnect Network (LIN), and suchlike.

As mentioned, review/comparison of occupant data 134A-*n*, seat data 138A-*n*, vehicle data 162A-*n*, and data populating configuration table 115 can be performed by the angle component 155 in conjunction with processes 165A-*n*, wherein processes 165A-*n* can be processes, operations, functions, workflows, algorithms, etc. Processes 165A-*n* can include a computer vision process(es), a digital imagery algorithm(s), analysis of occupant 128's posture, etc., respective position/recline/tilt of seat back 122 and/or seat base 124, and suchlike, to enable the respective determinations, predictions, etc., per the various embodiments presented herein.

As shown in FIG. 2A, a distance of concern can be distance L between the knees of the occupant 128 and a knee airbag 250, wherein the knee airbag 250 can be located under the dashboard of vehicle 102 (e.g., where seat 120 is a front seat located in the passenger compartment of vehicle 102) or incorporated into a seat/structure proximate to the seat (e.g., where seat 120 is a middle or rear seat). Accordingly, depending upon such measures as the posture of occupant 128, position of seat base 124, physiology (e.g., leg length, femur length) of occupant 128, etc., the position of seat base 124 can be controlled (e.g., by motors 175A-*n*) to maintain a particular distance L between the occupant 128's knees and the knee airbag 250.

In an embodiment, the angle δ can be a function of maintaining the angle of occupant 128's pelvis relative to the angle of the seat base 124. For example, the angle of seat base 124 may be increased to increase the probability of occupant 128's pelvis driving into the seat cushion of the seat base 124 rather than a less acute/shallower angle such that occupant 128's pelvis slides along the upper surface of seat base 124.

Figure 4:
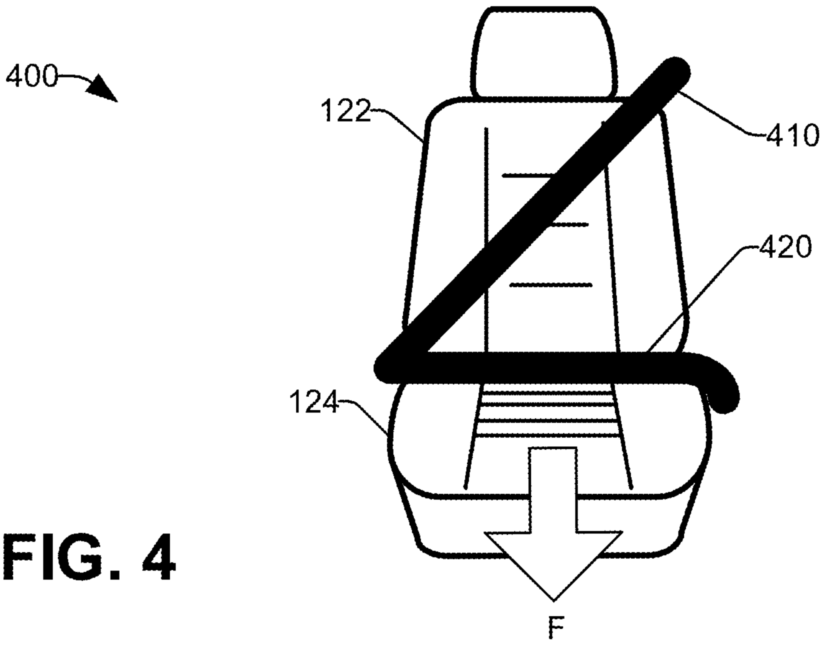
FIG. 4 is an image illustrating a seat and seat belt with a direction F of motion of an occupant during a rapid deceleration of a vehicle that includes the seat, in accordance with an embodiment.

In an embodiment, the tilt angle α and/or longitudinal distance γ placement of seat base 124 (e.g., relative to the seat back 122) can be controlled such that the loads generated/placed on occupant 128's body during a rapid deceleration of vehicle 102 are transferred to occupant 128's femurs/knees so as to reduce any lap belt loads (per FIG. 4).

It is to be appreciated that the foregoing are merely examples of the combination of respective position of seat back 122, seat base 124, and the physiology and posture of occupant 128, that can be considered when configuring the entries in the configuration table 115, and other combinations may be equally pertinent to the various embodiments presented herein.

Figure 3:
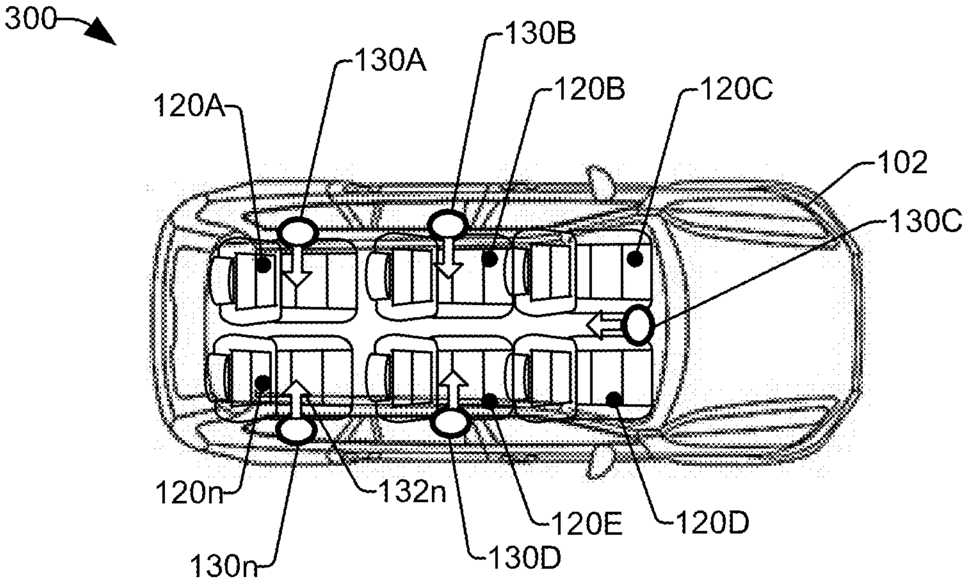
FIG. 3 is an image illustrating a vehicle with internal sensors configured to capture data regarding one or more occupants and/or seats in the vehicle, according to an embodiment.

FIG. 3, image 300 illustrates a vehicle with internal sensors configured to capture data regarding one or more occupants and/or seats in the vehicle, according to an embodiment. As shown, example vehicle 102 has six seats 120A-*n* located in the passenger compartment, with various cameras/sensors 130A-*n* configured to capture occupant data 134A-*n* for each occupant 128A-*n* that may sit in vehicle 102, wherein the respective cameras/sensors 130A-*n* can be aligned such that the respective occupant 128A-*n* and/or seat 120A-*n* is in the field of view 132A-*n* (as indicated by the arrows).

FIG. 4, image 400 illustrates a seat and seat belt with a direction F of motion of an occupant during a deceleration (e.g., rapid deceleration) of a vehicle that includes the seat, in accordance with an embodiment. As shown, seat 120 comprises a seat back 122 and a seat base 124, with a seat belt 410 utilized to secure/constrain an occupant in the seat. As shown, during deceleration of a vehicle (e.g., vehicle 102) momentum can cause an occupant 128 to move in direction F, such that the placement of the lap belt 420 portion of the seat belt 410 can be forced into the soft tissue of occupant 128's stomach region, which can potentially result in severe injury during a submarining event.

Figure 5:
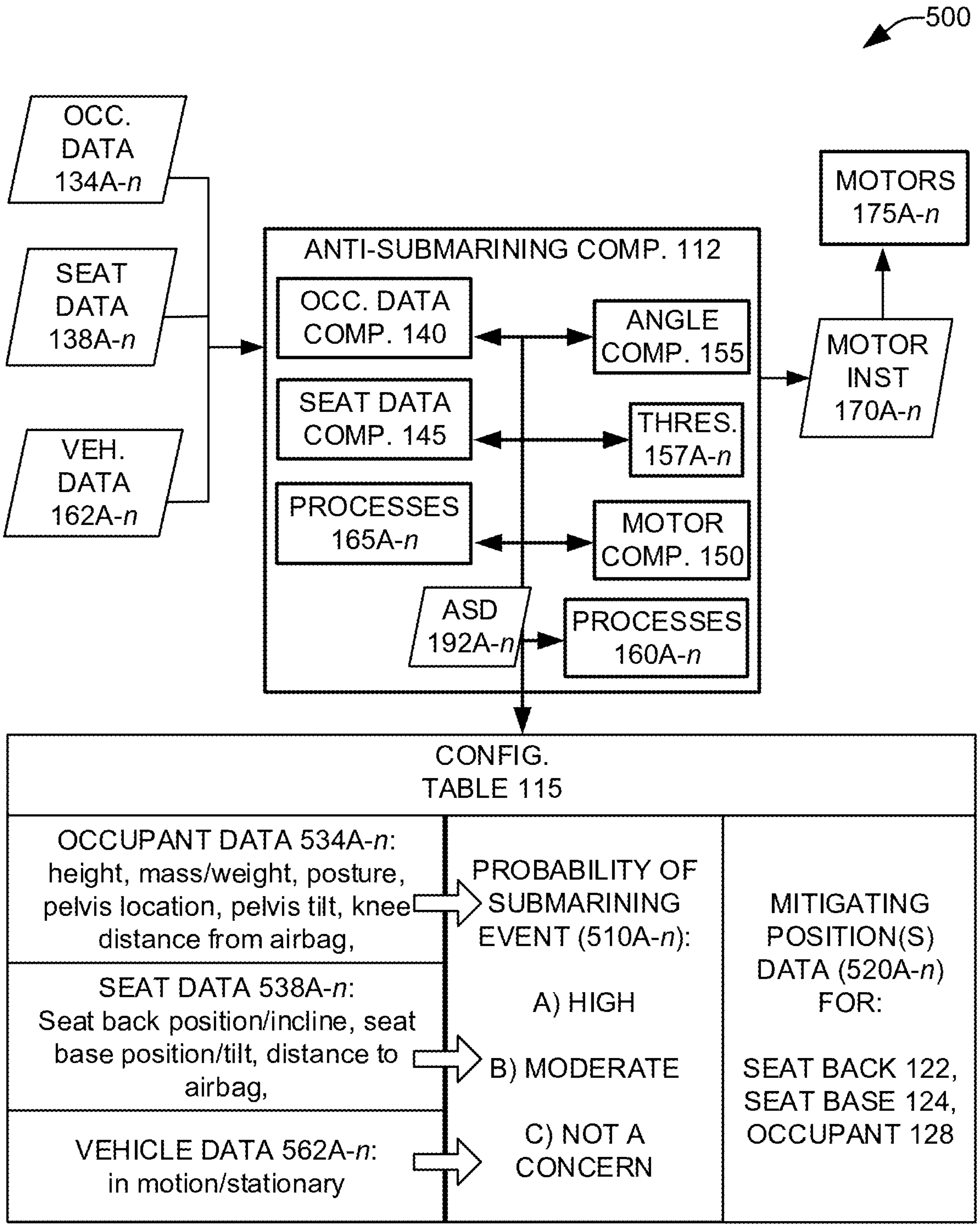
FIG. 5 presents a system illustrating components, sensors, data, etc., that can be utilized in a determination of a seat position to prevent/mitigate submarining, in accordance with an embodiment.

FIG. 5, system 500, illustrates components, sensors, data, etc., that can be utilized during determination of a seat position to prevent/mitigate submarining, in accordance with an embodiment. As shown, the anti-submarining component 112 can receive any of occupant data 134A-*n*, seat data 138A-*n*, and/or vehicle data 162A-*n*. The data 134A-*n*, 138A-*n*, and/or 162A-*n* can be reviewed by the angle component 155. The various components presented in FIG. 5 can communicate across bus 114 based on generation/transmission/receipt of anti-submarining data/instructions (ASD) 192A-*n*, e.g., angle component 155 communicates with motor component 150 using via instructions 172A-*n* including ASD 192A-*n*. In an embodiment, the angle component 155 can review respective values populating configuration table 115 to identify matches with the respective values provided in data 134A-*n*, 138A-*n*, and/or 162A-*n*. For example, data 134A-*n*, 138A-*n*, and/or 162A-*n* can include such values as occupant 128's approximate height, approximate mass of occupant 128, respective position of occupant 128's pelvis, distance L, angle β of seat back 122, angle α of seat base 124, position γ of seat base 124, a determined angle δ between the seat back 122 and the seat base 124, and suchlike. Upon receipt of the values in data 134A-*n*, 138A-*n*, and/or 162A-*n*, the angle component 155 can correlate the values to the values for occupant data 534A-*n*, seat data 538A-*n*, and/or vehicle data 562A-*n* prepopulating configuration table 115, wherein the values for data 534A-*n*, 538A-*n*, and/or 562A-*n* in the configuration table 115 may have an associated probability/value 510A-*n* of a submarining event, e.g., (a) high probability, (b) moderate probability, (c) submarining is not a concern, and suchlike. Based on the corresponding probability 510A-*n* of a submarining event occurring, the angle component 155 can be further configured to control the respective position of the seat back 122 and/or seat base 124. For example, the configuration table 115 may further include one or more positions (positions 520A-*n*) for seat back 122 and seat base 124 to reduce/mitigate the probability of submarining in view of the current positions of seat back 122 and seat base 124 in view of occupant 128's physiology, etc. The angle component 155 can be configured to extract and forward the mitigating positions (e.g., positions 520A-*n* in ASD 192A-*n*) to the motor component 150. Based on the positions 520A-*n* received from the angle component 155 in ASD 192A-*n*, the motor component 150 can generate and transmit one or more motor instructions 170A-*n* to the one or more motors 175A-*n* to position seat back 122 and seat base 124 in a position to reduce the probability of occupant 128 being involved in and/or injured during a submarining event. Hence, in response to angle component 155 determines probability 510A-*n* corresponds to (a) high probability, the position of seat back 122 can seat base 124 can be automatically adjusted by the ASC 112 to reduce the probability 510A-*n* to either of (b) moderate probability or (c) submarining is not a concern, e.g., as a function of the ability of the ASC 112 to reduce the probability 510A-*n* to (b) moderate probability, e.g., in the event that it is not possible to reduce probability 510A-*n* to (c) submarining is not a concern owing to occupant 128's physiology or unwillingness to overly change their posture (via tilt switch 210, recline switch 220), for example. In response to angle component 155 determines probability 510A-*n* corresponds to (b) moderate probability, the position of seat back 122 can seat base 124 can be automatically adjusted by the ASC 112 as required to reduce the probability 510A-*n* to (c) submarining is not a concern, however, as mentioned, occupant 128's physiology may prevent complete eradication of a submarining risk, and hence, ASC 112 operates motors 175A-*n* to mitigate the risk to as low a risk as possible, whereby occupant 128 may maintain respective positions β, α, δ, and/or γ of seat back 122 and seat base 124 at a (b) moderate probability of submarining. In response to angle component 155 determines probability 510A-*n* corresponds to (c) submarining is not a concern, the position of seat back 122 and seat base 124 can be left in their respective current positions.

In another embodiment, in the event of one or more values in data 134A-*n*, 138A-*n*, and/or 162A-*n* are not present in the configuration table 115, the angle component 155 can be configured to determine/infer one or more positions of seat back 122 and seat base 124 that have a respective probability of submarining occurring and select the respective position that has the lowest probability 510A-*n*. For example, positions of seat back 122 and seat base 124 having a probability 510A-*n* of (c) submarining is not a concern are selected over (b) moderate probability, while positions of seat back 122 and seat base 124 having a probability 510A-*n* of (b) moderate probability are selected over positions of seat back 122 and seat base 124 having a probability 510A-*n* of (a) high probability. Angle component 155 can make the various determinations/inferences in conjunction with one or more processes 165A-*n*. The respective probabilities 510A-*n* can be configured as thresholds 157A-*n* wherein the angle component 155 can be configured to choose the lowest threshold (c) submarining is not a concern over (b) moderate probability, over (a) high probability. As respective values for β, α, δ, and/or γ are determined by angle component 155, the respective values can be applied to configuration table 115 to supplement the values already populating configuration table 115.

In an example of operation, seat 120 can be configured to be positioned in a first position that has a particular probability of submarining based on seat position data 138A-*n* alone, but can be subsequently placed in a second position further based on occupant data 134A-*n* regarding the physiology of occupant 128.

In a further embodiment, the angle component 155 can make a determination that to reduce the probability 510A-*n* from (a) high probability to a (b) moderate probability, or preferably (c) submarining is not a concern, the angle component 155 can generate and transmit a notification 190A-*n* to the HMI 188, wherein notification 190A-*n* can include an instruction to occupant 128 to adjust their current position to reduce the probability 510A-*n* of submarining. In response to receiving notification 190A-*n*, the HMI 188 can be configured to present the notification 190A-*n* on screen 189 to make occupant 128 aware that, to reduce the risk of submarining, the occupant should 128 adjust their current position to a safer position.

As used herein, the terms "infer", "inference", "determine", and suchlike, refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As mentioned, angle component 155 can utilize the associated processes 165A-*n* which can utilize machine learning and reasoning techniques and other artificial intelligence technologies that employ probabilistic and/or statistical-based analysis to prognose or infer an action that a user desires to be automatically performed. The various embodiments presented herein can utilize various machine learning-based schemes for carrying out various aspects thereof. For example, a process 165A-*n* for reducing/mitigating the probability of an occupant 128 being involved in a submarining incident can be facilitated via an automatic classifier system and process.

A classifier is a function that maps an input attribute vector, x=(x1, x2, x3, x4, xn), to a class label class(x). The classifier can also output a confidence that the input belongs to a class, that is, $f$(x)=confidence(class(x)). Such classification can employ a probabilistic and/or statistical-based analysis (e.g., factoring into the analysis utilities and costs) to prognose or infer an action that a user desires to be automatically performed (e.g., reduction in injury from submarining by ASC 112).

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein is inclusive of statistical regression that is utilized to develop models of priority.

As will be readily appreciated from the subject specification, the various embodiments can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to predetermined criteria, reducing probability of submarining injury by ASC 112 as a function of seat data 138A-*n* and occupant data 134A-*n*, for example.

As described supra, inferences can be made, and operations performed, based on numerous pieces of information. For example, as seat data 138A-*n*, occupant data 134A-*n*, and/or vehicle data 162A-*n* is generated and compiled in conjunction with information 534A-*n*. 538A-*n*, and/or data 562A-*n*, and further combined with mitigating position data 520A-*n*, the respective data can be analyzed to determine converging patterns of probabilities 510A-*n* such that inferences can be made regarding reduction of injury from a submarining event.

Figure 6:
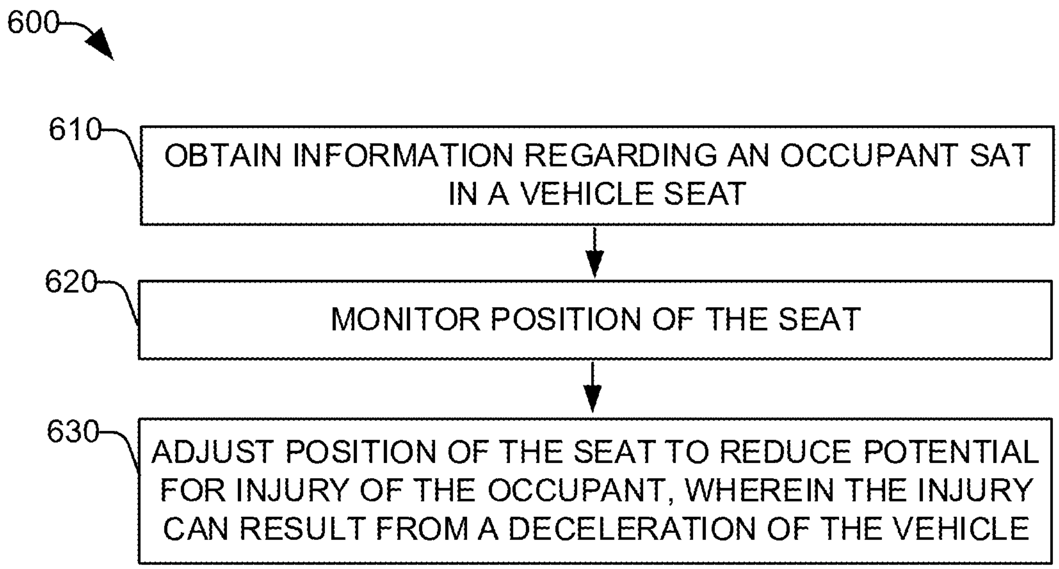
FIG. 6 illustrates a flow diagram for a computer-implemented methodology to minimize risk of injury to an occupant during a reduction in velocity of a vehicle in which the occupant is travelling, in accordance with at least one embodiment.

FIG. 6 illustrates a flow diagram 600 for a computer-implemented methodology to minimize risk of injury to an occupant during a reduction in velocity of a vehicle in which the occupant is travelling, in accordance with at least one embodiment.

At 610, data/information (e.g., occupant data 134A-*n*) regarding an occupant (e.g., occupant 128) located in a vehicle seat can be obtained, e.g., by various cameras, sensors, and suchlike (e.g., cameras/sensors 130A-*n*). As previously mentioned, the occupant data can include information regarding the occupant's height, physiology, weight/ mass, and suchlike, in conjunction with a current posture of the occupant in a vehicle seat (e.g., seat 120 located on vehicle 102).

At 620, position of the seat on which the occupant is sitting/reclining/sleeping can be monitored, e.g., by the cameras/sensors. For example, a first sensor can be located in the seat back (e.g., seat back 122) portion of the seat, and a second sensor can be located in the seat base (e.g., seat base 124), wherein the first sensor and the second sensor can generate seat position data (e.g., seat data 138A-*n*) regarding the respective position of the seat back and the seat base.

At 630, the occupant data and the seat position data can be analyzed and, further, a determination (e.g., by angle component 155, processes 165A-*n*, and data in configuration table 115) can be made regarding whether, with the current posture of the occupant and the position of the seat (e.g., position of respective seat back relative to the seat base), a probability of the occupant being injured due to submarining, is above a threshold (e.g., probabilities 510A-*n* and thresholds 157A-*n*). The position of the seat can be adjusted (e.g., by angle component 155 and motor component 150) to minimize the risk of injury to the occupant from a submarining event. For example, the angle of the seat base can be increased (e.g., by motors 175A-*n*) to reduce the probability of a submarining injury occurring.

Figure 7:
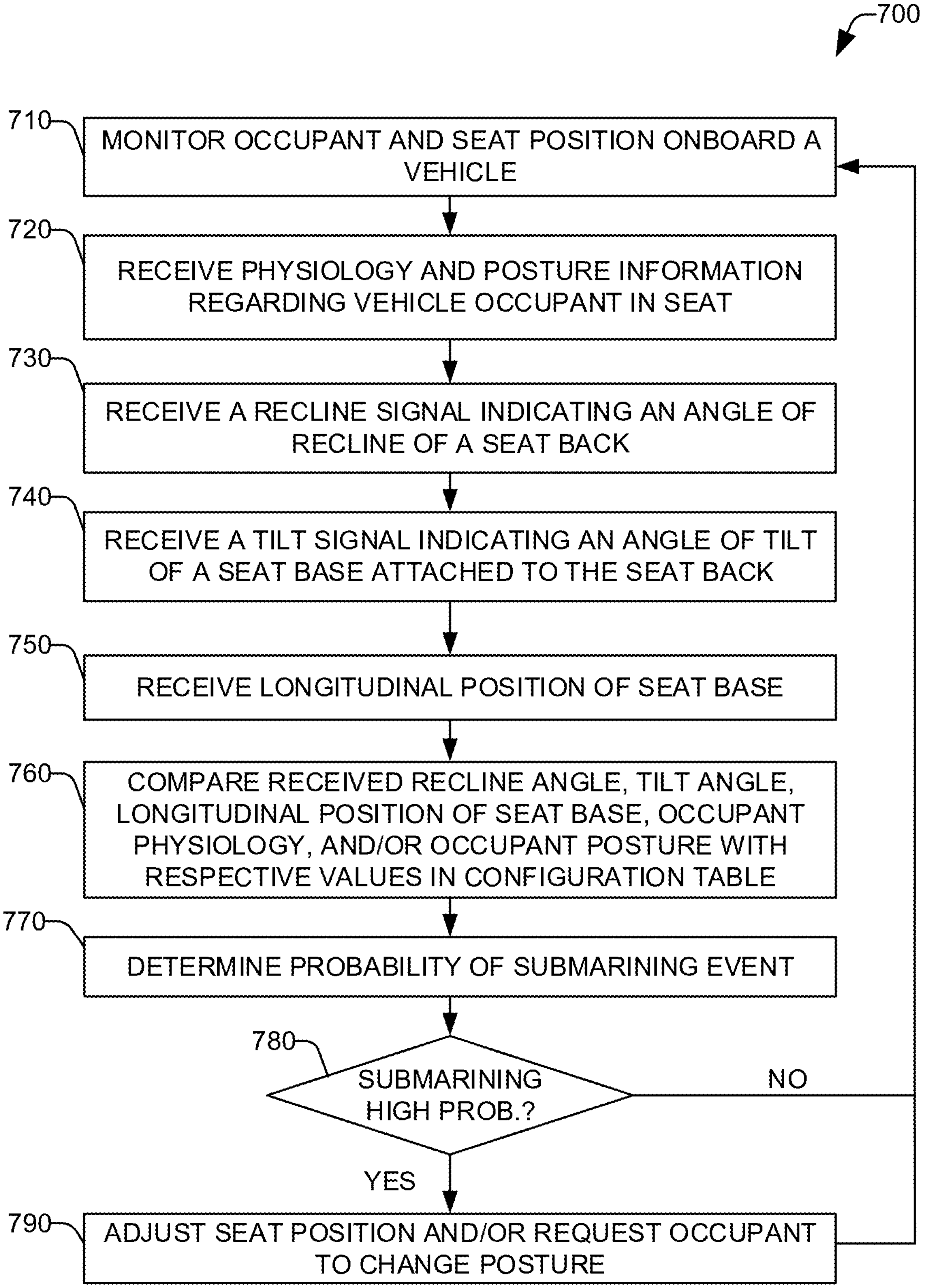
FIG. 7 illustrates a flow diagram for a computer-implemented methodology to minimize risk of injury to an occupant during a reduction in velocity of a vehicle in which the occupant is travelling, in accordance with at least one embodiment.

FIG. 7 illustrates a flow diagram 700 for a computer-implemented methodology to minimize risk of injury to an occupant during a reduction in velocity of a vehicle in which the occupant is travelling, in accordance with at least one embodiment.

At 710, a position/posture of an occupant (e.g., occupant 128) traveling in a vehicle (e.g., vehicle 102) can be monitored (e.g., by an anti-submarining system 110) in conjunction with the position of a seat (e.g., seat 120), wherein the seat can be comprised of a seat back (e.g., seat back 122) and a seat base (e.g., seat base 124).

At 720, occupant data (e.g., occupant data 134A-*n*) can be received at an anti-submarining component (e.g., at ASC 112) regarding the occupant's physiology and/or posture (e.g., occupant's pelvis position, femur length, and suchlike). The occupant data can be generated by one or more cameras/sensors (e.g., cameras/sensors 130A-*n*) configured to monitor the occupant, wherein the occupant data can be transmitted to the ASC.

At 730, seat data (e.g., seat data 138A-*n*, recline data 138A) regarding the position of the seat can be generated by respective cameras and sensors (e.g., by cameras/sensors 130A-*n*, recline sensor(s) 130A) monitoring the position of the seat, e.g., a recline angle $\beta$ of the seat back (e.g., seat back 122).

At 740, seat data (e.g., seat data 138A-*n*, tilt/position data 138B) regarding the angle $\alpha$ of the seat base (e.g., seat base 124) can be generated by the respective cameras and sensors monitoring the position of the seat.

At 750, further seat data can be generated regarding the longitudinal position $\gamma$ of the seat base, wherein the longitudinal position can be utilized to determine distance L, a distance between the seat base and an airbag (e.g., airbag 250). Furthermore, the distance L can be determined based on a location of the occupant's knees relative to the airbag.

At 760, the various the respective seat data and occupant data can be compared (e.g., by angle component 155) with corresponding/respective values (e.g., data 534A-*n* and data 538A-*n*) in a configuration table (e.g., configuration table 115).

At 770, the probability (e.g., 510A-*n*) of a submarining event can be determined (e.g., by angle component 155) based on the comparison of the received data and the values in the configuration table.

At 780, a determination can be made regarding the probability of whether a submarining event may occur. Any arbitrary measure can be utilized, e.g., a threshold (e.g., threshold 157A-*n*) or prepopulated values (e.g., probabilities 510A-*n*) regarding, for example, (a) high probability, (b) moderate probability, and/or (c) submarining is not a concern. In response to a determination of NO, the probability is low/negligible, e.g., (c) submarining is not a concern, methodology 700 can return to 710 for further monitoring of the occupant(s) and/or seat(s) regarding a submarining event occurring.

At 780, in response to YES, a (a) high probability or (b) moderate probability exists of a submarining event occurring, methodology 700 can advance to 790. An instruction (e.g., in motor instructions 170A-*n*) can be generated and transmitted (e.g., by motor component 150) to one or more motors (e.g., motors 175A-*n*). The one or more motors can be configured to receive the instruction(s) and adjust alignment/position of the seat (e.g., the seat base, the seat back) to reduce the probability of a submarining event occurring. Further, the angle component can generate an instruction (e.g. notification 190A-*n*) requesting the occupant to adjust their posture to reduce the probability of the submarining event occurring. In an embodiment, the notification can be received by an HMI (e.g., HMI 188) for presentment on a screen (e.g., screen 189). Methodology 700 can return to 710 for further monitoring and determination of a submarining event occurring.

Figure 8:
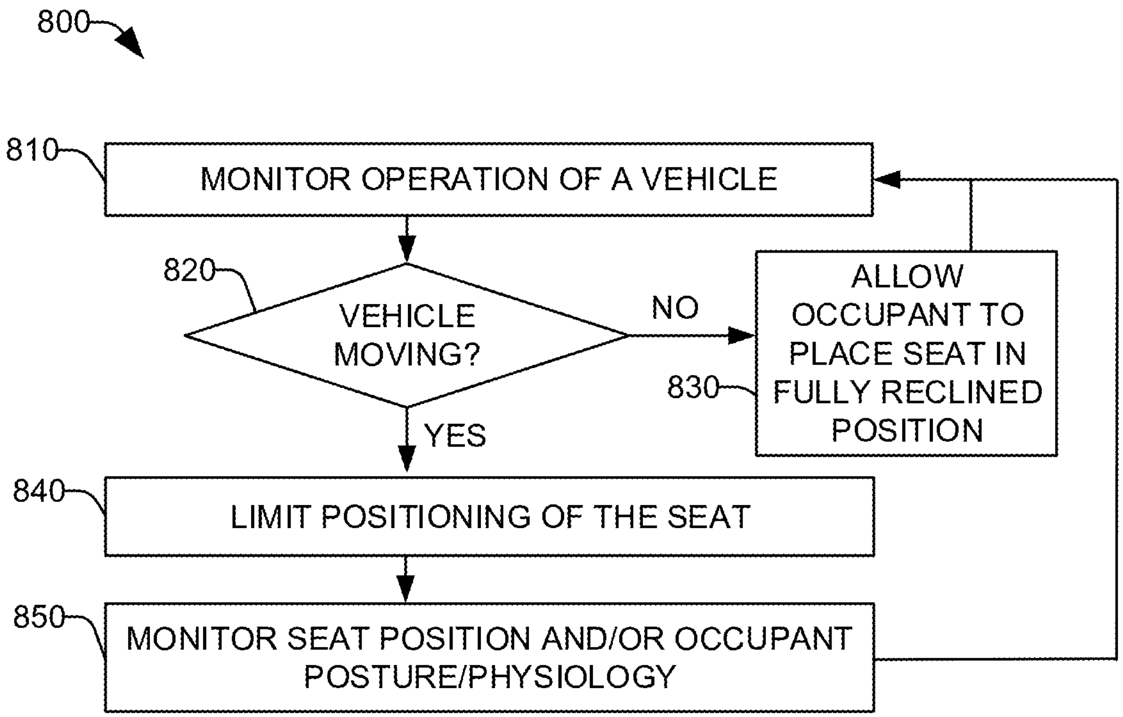
FIG. 8 illustrates a flow diagram for a computer-implemented methodology to minimize risk of injury to an occupant during a reduction in velocity of a vehicle in which the occupant is travelling, in accordance with at least one embodiment.

FIG. 8 illustrates a flow diagram 800 for a computer-implemented methodology to minimize risk of injury to an occupant during a reduction in velocity of a vehicle in which the occupant is travelling, in accordance with at least one embodiment.

At 810, operation of a vehicle (e.g., vehicle 102) is monitored by an anti-submarining system (e.g., anti-submarining system 110, ASC 112). The anti-submarining system can be coupled to a vehicle component (e.g., a vehicle component 160) configured to monitor operation of the vehicle, e.g., braking, deceleration, etc. As part of the monitoring, the anti-submarining system can make a determination as to whether the vehicle is moving or stationary (e.g., per vehicle data 162A-*n*). Further, the monitoring of the vehicle can involve monitoring position of a seat (e.g., seat 120) and its parts (e.g., seat back 122, seat base 124).

At 820, in response to a determination that NO, the vehicle is not moving, methodology 800 can advance to 830, whereby the occupant (e.g., occupant 128) can recline the seat to the fully reclined position (e.g., to sleep) even though the fully reclined position has a high probability of a submarining event occurring (e.g., when the vehicle is in motion). Methodology 800 can return to 810 for further monitoring of operation of the vehicle to be performed.

Returning to 820, in response to a determination that YES the vehicle is in motion, methodology can advance to 840. At 840, positioning of the seat can be limited to reduce the probability of a submarining event occurring, as previously described. As mentioned, the seat back of the onboard seat can be reclined beyond a maximum $\delta_{max}/\beta_{max}$ recline, but such angle(s) have a high probability of submarining during motion of the vehicle. Accordingly, the seat can be automatically positioned in a configuration to reduce the probability of submarining. An angle component (e.g., angle component 155) can obtain seat data (e.g., seat data 138A-*n*)

from cameras/sensors (e.g., cameras/sensors 130A-*n*) located in the seat or in the camera's field of view. The angle component can communicate with/instruct (e.g., via anti-submarining data/instructions (ASD) 192A-*n*) a motor component (e.g., motor component 150) to control one or more motors (e.g., motors 175A-*n*) to adjust the seat position. In response to receiving the anti-submarining instructions, the motor component can be configured to transmit instructions (e.g., motor instructions 170A) to the motors to control operation of the motors, as previously described. Methodology 800 can advance to 850, wherein the seat position and/or occupant can be further monitored, as previously described. The methodology 800 can return to 810 for further monitoring of the vehicle operation.

Figure 9:
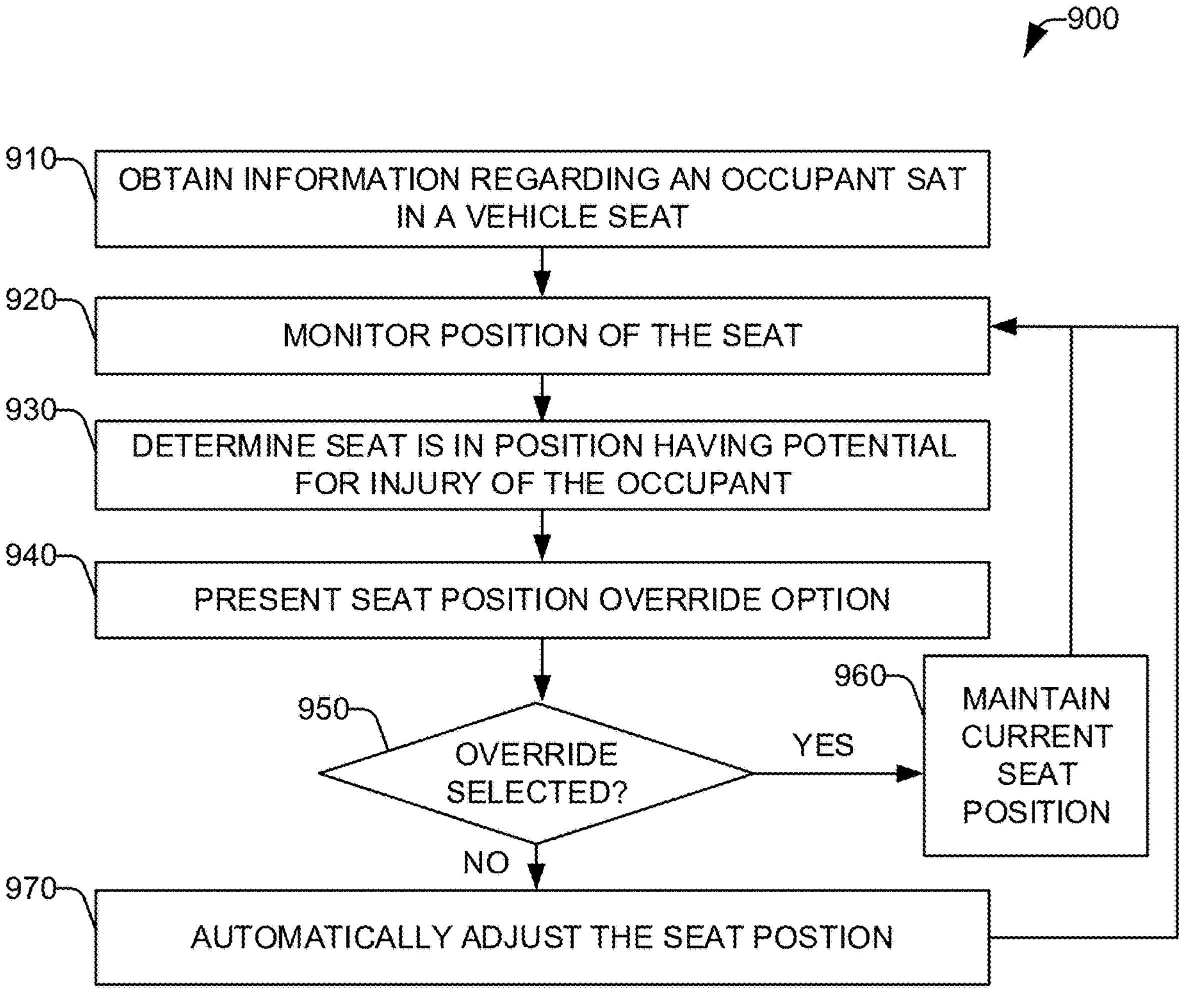
FIG. 9 illustrates a flow diagram 900 for a computer-implemented methodology to manually override automatic seat adjustment, in accordance with at least one embodiment.

FIG. 9 illustrates a flow diagram 900 for a computer-implemented methodology to manually override automatic seat adjustment, in accordance with at least one embodiment.

At 910, data/information (e.g., occupant data 134A-*n*) regarding an occupant (e.g., occupant 128) located in a vehicle seat (e.g., seat 120 located on vehicle 102) can be obtained, e.g., by various cameras, sensors, and suchlike (e.g., cameras/sensors 130A-*n*). As previously mentioned, the occupant data can include anthropomorphic information regarding the occupant's height, physiology, weight/mass, and suchlike, in conjunction with a current posture of the occupant in a vehicle seat.

At 920, position of the seat on which the occupant is sitting/reclining/sleeping can be monitored, e.g., by the cameras/sensors. For example, a first sensor can be located in the seat back (e.g., seat back 122) portion of the seat, and a second sensor can be located in the seat base (e.g., seat base 124), wherein the first sensor and the second sensor can generate seat position data (e.g., seat data 138A-*n*) regarding the respective position of the seat back and the seat base.

At 930, the occupant data and the seat position data can be analyzed and, further, a determination (e.g., by angle component 155, processes 165A-*n*, and data in configuration table 115) can be made regarding whether, with the current posture of the occupant and the position of the seat (e.g., position of respective seat back relative to the seat base), a probability of the occupant being injured due to submarining, is above a threshold (e.g., probabilities 510A-*n* and thresholds 157A-*n*). The position of the seat can be adjusted (e.g., by angle component 155 and motor component 150) to minimize the risk of injury to the occupant from a submarining event. For example, the angle of the seat base can be increased (e.g., by motors 175A-*n*) to reduce the probability of a submarining injury occurring.

At 940, in response to a determination (e.g., by angle component 155) that the seat is in a position having potential for injury of the occupant, e.g., in event of a submarining event happening, a notification (e.g., notification 190A) can be presented to the occupant via an interactive screen (e.g., screen 189 presented on HMI 188) indicating, for example, "the current position of the seat has potential for injury in the event of a collision, and adjustment of the seat is recommended and will be performed unless occupant overrides". Wherein the notification can be accompanied by a button/touch sensitive area on the interactive screen, whereby selection of the button overrides the automatic seat adjustment. The screen can be further configured with a counter, such that if the button is selected prior to the counter elapsing, the automatic adjustment of the seat is overridden, otherwise, in the event of the counter elapsing, the seat adjustment proceeds automatically.

At 950, in response to a determination that YES, the button was pressed, methodology 900 can advance to 960, whereupon the current seat position can be maintained, with methodology 900 returning to 920 for further monitoring of the seat position to be undertaken. For example, the occupant may subsequently adjust position of the seat and, given the occupant's anthropomorphology, the occupant may be further prompted to confirm they are overriding the automatic adjustment. In another embodiment, the selection of the button on the screen can be configured such that the occupant is not requested to override the automatic adjustment, with the override in place throughout the journey/occupant is sat in seat.

At 950, in response to a determination that NO, the button was not pressed/counter elapsed, methodology 900 can advance to 970, whereupon the seat position can be automatically adjusted, with methodology 900 returning to 920 for further monitoring of the seat position to be undertaken.

Example Operating Environment and Scenarios

Figure 10:
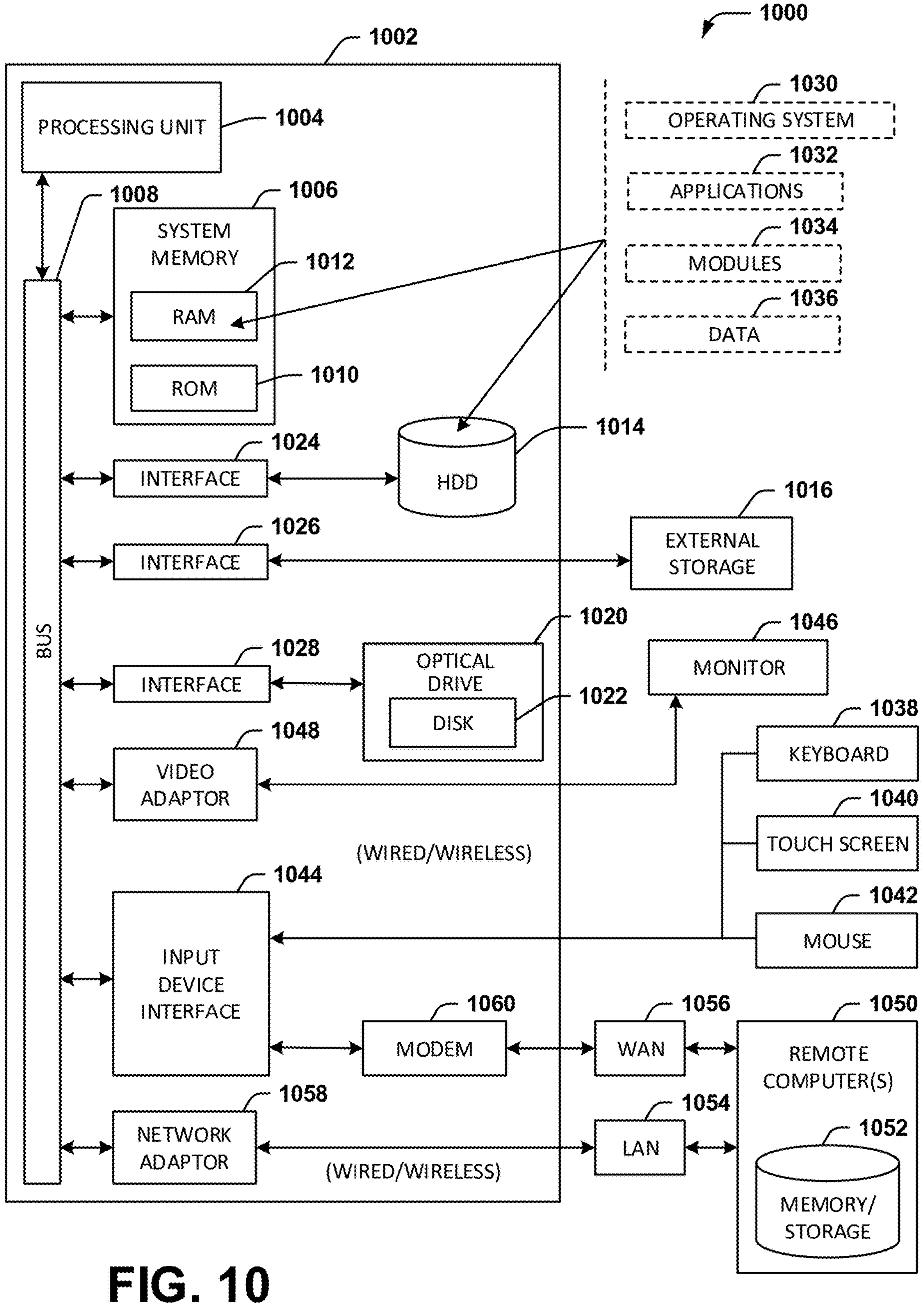
FIG. 10 is a block diagram illustrating an example computing environment in which the various embodiments described herein can be implemented.
Figure 11:
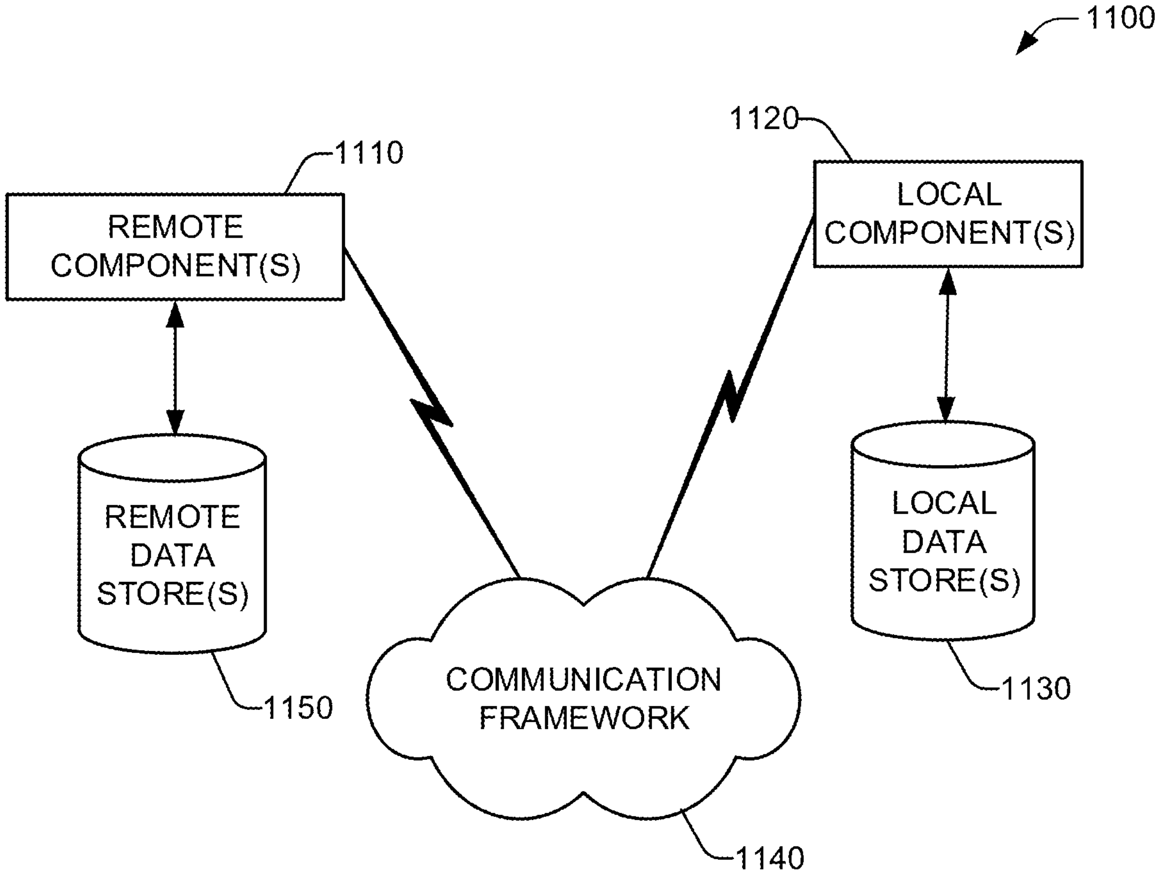
FIG. 11 is a block diagram illustrating an example computing environment with which the disclosed subject matter can interact, in accordance with an embodiment.

Turning next to FIGS. 10 and 11, a detailed description is provided of additional context for the one or more embodiments described herein with FIGS. 1-9.

In order to provide additional context for various embodiments described herein, FIG. 9 and the following discussion are intended to provide a brief, general description of a suitable computing environment 1000 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infra-red and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors and may include a cache memory. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infra-red (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1094 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

Referring now to details of one or more elements illustrated at FIG. 11, an illustrative cloud computing environment 1100 is depicted. FIG. 11 is a schematic block diagram of a computing environment 1100 with which the disclosed subject matter can interact. The system 1100 comprises one or more remote component(s) 1110. The remote component(s) 1110 can be hardware and/or software (e.g., threads, processes, computing devices). In some embodiments, remote component(s) 1110 can be a distributed computer system, connected to a local automatic scaling component and/or programs that use the resources of a distributed computer system, via communication framework 1140. Communication framework 1140 can comprise wired network devices, wireless network devices, mobile devices, wearable devices, radio access network devices, gateway devices, femtocell devices, servers, etc.

The system 1100 also comprises one or more local component(s) 1120. The local component(s) 1120 can be hardware and/or software (e.g., threads, processes, computing devices). In some embodiments, local component(s) 1120 can comprise an automatic scaling component and/or programs that communicate/use the remote resources 1110 and 1120, etc., connected to a remotely located distributed computing system via communication framework 1140.

One possible communication between a remote component(s) 1110 and a local component(s) 1120 can be in the form of a data packet adapted to be transmitted between two or more computer processes. Another possible communication between a remote component(s) 1110 and a local component(s) 1120 can be in the form of circuit-switched data adapted to be transmitted between two or more computer processes in radio time slots. The system 1100 comprises a communication framework 1140 that can be employed to facilitate communications between the remote component(s) 1110 and the local component(s) 1120, and can comprise an air interface, e.g., Uu interface of a UMTS network, via a long-term evolution (LTE) network, etc. Remote component(s) 1110 can be operably connected to one or more remote data store(s) 1150, such as a hard drive, solid state drive, SIM card, device memory, etc., that can be employed to store information on the remote component(s)

1110 side of communication framework 1140. Similarly, local component(s) 1120 can be operably connected to one or more local data store(s) 1130, that can be employed to store information on the local component(s) 1120 side of communication framework 1140.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "client entity," "consumer," "client entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Various non-limiting aspects of various embodiments described herein are presented in the following clauses:

Clause 1: A system, located onboard a vehicle, comprising: a memory that stores computer executable components, and a processor that executes the computer executable components stored in the memory, wherein the computer executable components comprise an anti-submarining component configured to: determine an occupant is located in a seat onboard the vehicle, determine a seat angle between a seat back and a seat base, wherein the seat back and seat base combine to form the seat, and in the event of the seat angle exceeds a first unsafe angle, adjust the position of at least one of the seat back or the seat base to reduce the seat angle, wherein the first unsafe angle has a magnitude to render a submarining event involving the occupant likely.

Clause 2: The system of any preceding clause, wherein the anti-submarining component is further configured to: determine at least one feature of the occupant, wherein the at least one feature comprises the occupant's physiology, location of the occupant's pelvis, tilt angle of the occupant's pelvis, the occupant's height, or the occupant's posture, determine, based on the at least one feature of the occupant, whether the seat angle is at a second unsafe angle, and in the event of determining the seat angle is at the second unsafe angle, reducing the seat angle.

Clause 3: The system of any preceding clause, further comprising a first sensor configured to determine at least one of the occupant is located in the seat, the occupant's physiology, the occupant's height, or the occupant's posture, wherein the first sensor is a camera or a radar device.

Clause 4: further comprising a second sensor located in the seat back, wherein the second sensor is configured to determine an angle of recline of the seat back.

Clause 5: The system of any preceding clause, further comprising a third sensor located in the seat base, wherein the third sensor is configured to determine at least one of an angle of tilt of the seat base or a longitudinal position of the seat base.

Clause 6: The system of any preceding clause, wherein the anti-submarining component is further configured to determine the seat angle based on an angle between the angle of recline of the seat back and the angle of tilt of the seat base.

Clause 7: The system of any preceding clause, wherein the anti-submarining component is further configured to: determine a distance between the occupant and an airbag; and in the event that the distance is insufficient, adjust position of the seat base in the longitudinal direction to reduce the distance.

Clause 8: The system of any preceding clause, wherein the vehicle is operating in an autonomous manner.

Clause 9: The system of any preceding clause, further comprising one or more motors configured to adjust the position of at least one of the seat back or the seat base to reduce the seat angle; and wherein the anti-submarining component is further configured to transmit an instruction to the one or more motors instructing the one or more motors to operate to reduce the seat angle.

Clause 10: The system of any preceding clause, wherein the anti-submarining component is further configured to: generate and transmit a notification regarding the position of the seat being adjusted, and the system further comprises a display component configured to present the notification to the occupant indicating the seat is being adjusted.

Clause 11: A computer-implemented method comprising: determining, by a device comprising a processor located on a vehicle, a person is located on a seat located onboard the vehicle, wherein the seat comprises a seat back and a seat base; and adjusting, by the device, at least one of a position of the seat back or the seat base to mitigate possibility of the person being involved in a submarining incident, wherein the submarining incident results from a deceleration of the vehicle.

Clause 12: The computer-implemented method of any preceding clause, further comprising: determining, by the device, at least one feature of the person, wherein the at least one feature comprises the person's physiology, location of the person's pelvis, tilt angle of the person's pelvis, the person's height, or the person's posture; determining, by the device, based on the at least one feature of the occupant, whether the seat angle is at the unsafe angle; and in the event of determining the seat angle is at the unsafe angle, reducing the seat angle.

Clause 13: The computer-implemented method of any preceding clause, further comprising: in response to a determination of the seat is at an unsafe angle, presenting a notification on a display in the vehicle, wherein the notification is a request for the person to change their posture.

Clause 14: The computer-implemented method of any preceding clause, further comprising: determining, by the device, the vehicle is stationary; and in response to determining the vehicle is stationary, terminating determining position of the seat back or the seat base.

Clause 15: The computer-implemented method of any preceding clause, wherein the vehicle is operating in an autonomous manner.

Clause 16: A computer program product for adjusting position of a seat belt located on a vehicle, the computer program product comprising a computer readable storage medium having program instructions embodied therewith, the program instructions executable by a processor to cause the processor to: determine a person is located on a seat located onboard the vehicle, wherein the seat comprises a seat back and a seat base; and adjust at least one of a position of the seat back or the seat base to mitigate possibility of the person being involved in a submarining incident, wherein the submarining incident results from a deceleration of the vehicle.

Clause 17: The computer program product of any preceding clause, wherein the program instructions are further executable by the processor to: determine at least one anthropomorphic feature of the person, wherein the at least one anthropomorphic feature comprises the person's physiology, location of the person's pelvis, tilt angle of the person's pelvis, the person's height, or the person's posture; determine, based on the at least one anthropomorphic feature of the occupant, whether the seat angle is at an unsafe angle; and in the event of determining the seat angle is at the unsafe angle, adjusting the seat angle to mitigate the possibility of the person being involved in a submarining event.

Clause 18: The computer program product of any preceding clause, wherein the program instructions are further executable by the processor to in response to a determination of the seat is at an unsafe angle, present a notification on a display in the vehicle, wherein the notification is a request for the person to change their posture.

Clause 19: The computer program product of any preceding clause, wherein the program instructions are further executable by the processor to: determine the vehicle is stationary; and in response to determining the vehicle is stationary, terminating determining position of the seat back or the seat base.

Clause 20: The computer program product of any preceding clause, wherein the program instructions are further executable by the processor to cause the processor to, prior to adjusting at least one of the position of the seat back or the seat base: presenting a notification on a display in the vehicle indicating that the current seat angle between the seat back and the seat base is unsafe, wherein the notification includes an adjustment override option; detecting interaction with the adjustment override option; and in response to detecting interaction indicating selection of adjustment override, maintaining the current seat angle; and in response to detecting interaction indicating automatic adjustment enabled, automatically adjusting at least one of the position of the seat back or the seat base to mitigate possibility of the person being involved in a submarining incident.

In various cases, any suitable combination of clauses 1-10 can be implemented.

In various cases, any suitable combination of clauses 11-15 can be implemented.

In various cases, any suitable combination of clauses 16-20 can be implemented.

What is claimed is:

1. A system, located onboard a vehicle, comprising:
- a memory that stores computer executable components; and
- a processor that executes at least one of the computer executable components that:
  - determines an occupant is located in a seat onboard the vehicle;
  - determines at least one feature of the occupant;
  - based on the at least one feature of the occupant, determines a maximum angle between a seat back of the seat and a seat base of the seat for prevention of a potential occurrence of a submarining event involving the occupant, wherein the seat back and the seat base combine to form the seat;
  - determines a current seat angle between the seat back and the seat base; and
  - in response to the current seat angle exceeding the maximum angle:
    - determines a distance between a knee of the occupant and a portion of a dashboard located in front of the seat, and
    - in response to the distance being greater than a threshold distance for prevention of the potential occurrence of the submarining event, adjusts a position of the seat base to reduce the distance to below the threshold distance.

2. The system of claim 1, wherein the at least one feature comprises a physiology of the occupant, a location of a pelvis of the occupant, a tilt angle of the pelvis, a height of the occupant, or a posture of the occupant.

3. The system of claim 1, further comprising a sensor employed to determine at least one of the occupant is located in the seat or the at least one feature of the occupant, and wherein the sensor is a camera or a radar device.

4. The system of claim 1, wherein the portion of the dashboard comprises a knee airbag.

5. The system of claim 1, further comprising:

a first sensor located in the seat back, wherein the first sensor is configured to determine an angle of recline of the seat back, and a second sensor located in the seat base, wherein the second sensor is configured to determine an angle of tilt of the seat base.

6. The system of claim 5, wherein the at least one of the computer executable components further:

determines the current seat angle based on an angle between the angle of recline of the seat back and the angle of tilt of the seat base.

7. The system of claim 1, wherein the at least one of the computer executable components further:

in response to the current seat angle exceeding the maximum angle, adjusts at least one of the seat back or the seat base to reduce the current seat angle to a new seat angle that is below the maximum angle.

8. The system of claim 1, wherein the vehicle is operating in an autonomous manner.

9. The system of claim 7, further comprising one or more motors configured to adjust the at least one of the seat back or the seat base; and wherein the at least one of the computer executable components further transmits an instruction to at least one of the one or more motors to operate to reduce the current seat angle.

10. The system of claim 1, wherein the at least one of the computer executable components further:

presents, via a display device of the vehicle, a notification regarding the seat being adjusted.

11. A computer-implemented method comprising:

determining, by a system comprising a processor located on a vehicle, a person is located on a seat onboard the vehicle, wherein the seat comprises a seat back and a seat base;

determining, by the system, at least one feature of the person;

based on the at least one feature of the person, determining, by the system, a maximum angle between the seat back and the seat base for prevention of a potential occurrence of a submarining event involving the person with respect to a lap belt portion of a seat belt associated with the seat;

determining, by the system, a current seat angle between the seat back and the seat base; and in response to the current seat angle exceeding the maximum angle:

determining, by the system, a distance between a knee of the person and a portion of a dashboard located in front of the seat, and in response to the distance being greater than a threshold distance for prevention of the potential occurrence of the submarining event, adjusting, by the system, a position of the seat base to reduce the distance to below the threshold distance.

12. The computer-implemented method of claim 11, wherein the at least one feature comprises a physiology of the person, a location of a pelvis of the person, a tilt angle of the pelvis, a height of the person, or a posture of the person.

13. The computer-implemented method of claim 11, wherein the portion of the dashboard comprises a knee airbag.

14. The computer-implemented method of claim 11, further comprising:

in response to the current seat angle exceeding the maximum angle, adjusting, by the system, at least one of the seat back or the seat base to reduce the current seat angle to a new seat angle that is below the maximum angle.

15. The computer-implemented method of claim 11, wherein the vehicle is operating in an autonomous manner.

16. A computer program product comprising a computer readable storage medium having program instructions embodied therewith, the program instructions executable by a processor of a vehicle to cause the processor to:

determine a person is located on a seat onboard the vehicle, wherein the seat comprises a seat back and a seat base;

determine at least one feature of the person;

based on the at least one feature of the person, determine a maximum angle between the seat back and the seat base for prevention of a potential occurrence of a submarining event involving the person with respect to a lap belt portion of a seat belt associated with the seat;

determine a current seat angle between the seat back and the seat base; and in response to the current seat angle exceeding the maximum angle:

determine a distance between a knee of the person and a portion of a dashboard located in front of the seat, and in response to the distance being greater than a threshold distance for prevention of the potential occurrence of the submarining event, adjust a position of the seat base to reduce the distance to below the threshold distance.

17. The computer program product of claim 16, wherein the at least one feature comprises a physiology of the person, a location of a pelvis of the person, a tilt angle of the pelvis, a height of the person, or a posture of the person.

18. The computer program product of claim 16, wherein the portion of the dashboard comprises a knee airbag.

19. The computer program product of claim 16, wherein the program instructions are further executable by the processor to cause the processor to:

in response to the current seat angle exceeding the maximum angle, adjust at least one of the seat back or the seat base to reduce the current seat angle to a new seat angle that is below the maximum angle.

20. The computer program product of claim 19, wherein the program instructions are further executable by the processor to cause the processor to, prior to adjusting the at least one of the seat back or the seat base:

presenting a notification on a display in the vehicle indicating that the current seat angle is unsafe, wherein the notification comprises an adjustment override option;

detecting interaction with the adjustment override option; and in response to the detecting of the interaction indicating selection of adjustment override, maintaining the current seat angle; and in response to the detecting of the interaction indicating automatic adjustment enabled, adjusting the at least one of the seat back or the seat base.

* * * * *